United States Patent
Li et al.

(10) Patent No.: US 12,052,080 B2
(45) Date of Patent: Jul. 30, 2024

(54) SECURE SOUNDING SIGNAL WITHOUT UNINTENTIONAL BEAMFORMING EFFECT

(71) Applicant: Intel Corporation, Santa Clara, CA (US)

(72) Inventors: Qinghua Li, San Ramon, CA (US);
Xiaogang Chen, Portland, OR (US);
Assaf Gurevitz, Ramat Hasharon (IL);
Feng Jiang, Santa Clara, CA (US);
Xintian Lin, Palo Alto, CA (US);
Jonathan Segev, Tel Mond (IL); Gadi Shor, Tel Aviv (IL); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 306 days.

(21) Appl. No.: 17/318,382

(22) Filed: May 12, 2021

(65) Prior Publication Data

US 2021/0266055 A1 Aug. 26, 2021

Related U.S. Application Data

(60) Provisional application No. 63/066,485, filed on Aug. 17, 2020, provisional application No. 63/023,541, filed on May 12, 2020.

(51) Int. Cl.
*H04B 7/06* (2006.01)
*H04B 7/0413* (2017.01)
*H04L 5/00* (2006.01)

(52) U.S. Cl.
CPC ......... *H04B 7/0682* (2013.01); *H04B 7/0413* (2013.01); *H04B 7/0617* (2013.01); *H04L 5/0053* (2013.01)

(58) Field of Classification Search
CPC .. H04B 7/0682; H04B 7/0413; H04B 7/0617; H04L 5/0053; H04L 5/0048
See application file for complete search history.

(56) References Cited

U.S. PATENT DOCUMENTS

| | | | |
|---|---|---|---|
| 2019/0043388 A1* | 2/2019 | Li | H04L 9/0618 |
| 2020/0220592 A1* | 7/2020 | Ryu | H04B 7/0473 |
| 2021/0218527 A1* | 7/2021 | Li | H04L 5/0048 |

* cited by examiner

*Primary Examiner* — Jamal Javaid
*Assistant Examiner* — Ryan C Kavleski
(74) *Attorney, Agent, or Firm* — Eversheds Sutherland (US) LLP

(57) ABSTRACT

This disclosure describes systems, methods, and devices related to secure sounding signal. A device may generate two or more sounding signals to be sent using two or more antennas to a receiving device across a plurality of symbol intervals. The device may apply a first masking signal to a first sounding signal of the two or more sounding signals over a first symbol interval of the plurality of the symbol intervals. The device may apply a second masking signal to a second sounding signal over a second symbol interval of the plurality of the symbol intervals. The device may cause to send the two or more sounding signals to receiving device using the two or more antennas.

20 Claims, 18 Drawing Sheets

SECURE SOUNDING SIGNAL WITHOUT UNINTENTIONAL BEAMFORMING EFFECT

CROSS-REFERENCE TO RELATED APPLICATION(S)

This application claims the benefit of U.S. Provisional Application No. 63/023,541, filed May 12, 2020, and U.S. Provisional Application No. 63/066,485, filed Aug. 17, 2020, both disclosures of which are incorporated herein by reference as if set forth in full.

TECHNICAL FIELD

This disclosure generally relates to systems and methods for wireless communications and, more particularly, to secure sounding signal without unintentional beamforming effects.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
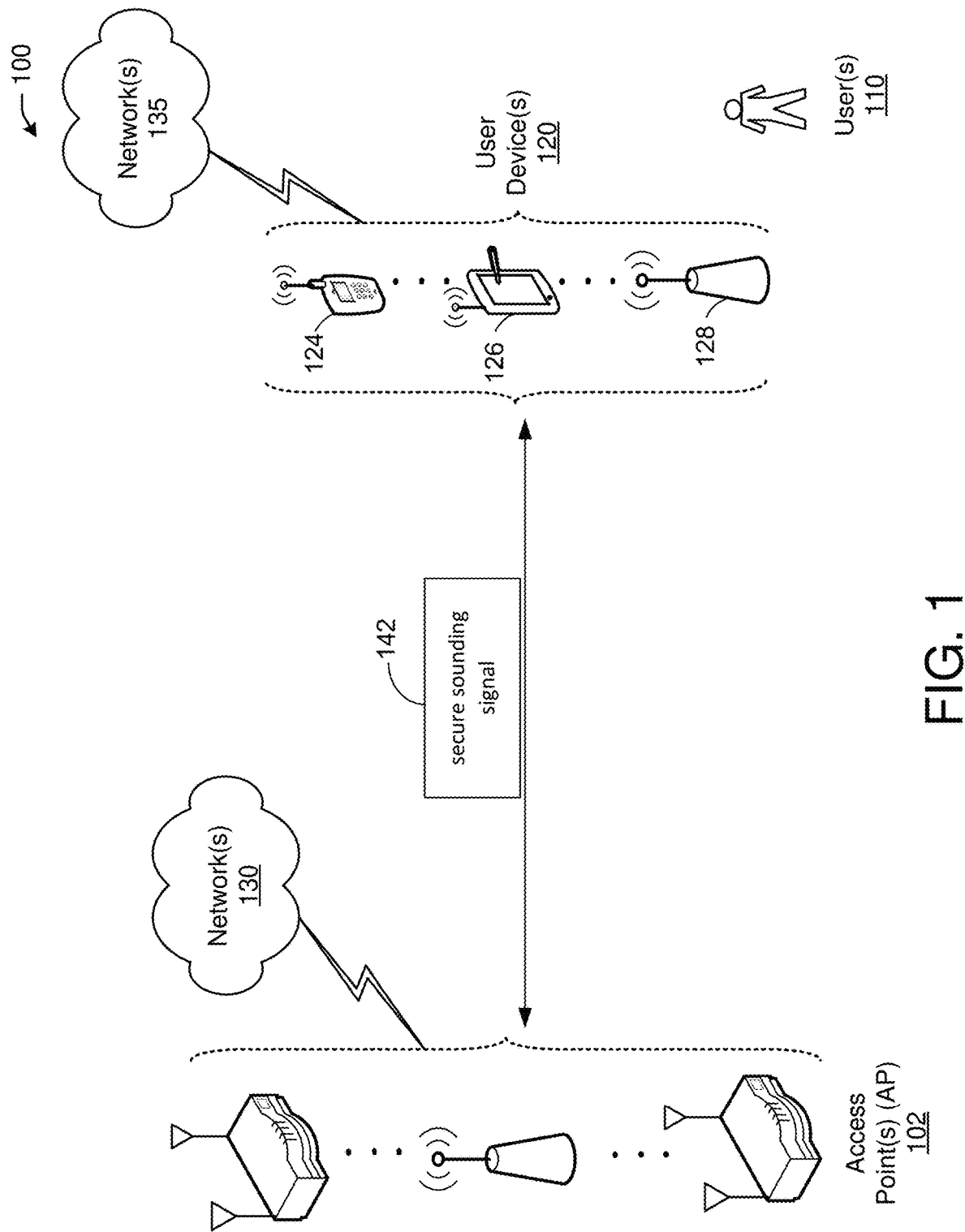
FIG. 1 is a network diagram illustrating an example network environment for secure sounding signal, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

It is known that the current IEEE 802.11az secure sounding signal may cause unintentional beamforming such that the received signal power fluctuates significantly. Although the beamforming duration is short and does not violate Federal Communications Commission (FCC) rules, it is desirable to fix this problem.

Channel sounding is a technique that evaluates the radio environment for wireless communication, especially MIMO systems. Because of the effect of terrain and obstacles, wireless signals propagate in multiple paths. Channel sounding is used to minimize the multipath effect by processing the multidimensional spatial-temporal signal and estimating channel characteristics.

The known solution is to send delayed sounding signals in addition to the original sounding signal. The delayed signal interacts with the original such that the unintentional beamforming effect is mitigated.

It should be understood that very high throughput (VHT) null data packet (NDP) Sounding-based 802.11az protocol is referred to as VHTz and high efficiency (HE) null data packet (NDP) Sounding-based 802.11az protocol is referred to as HEz. Basically, VHTz is based on the 802.11ac NDP and is a single user sequence; HEz is based on 802.11ax NDP and 802.11az NDP and it is a multiuser sequence.

Time-domain pulse sequence is likely to be adopted by IEEE 802.11az as the secure sounding signal. The previous designs are for OFDM-based sounding signal, which were showed to be not secure enough for future applications. For supporting multiple transmit antennas, the following design options are proposed. The legacy P-matrix encoding cannot be applied. In the legacy P-matrix encoding, the same sounding signal repeats in multiple OFDM symbols. If the legacy P-matrix is employed, the attacker can record the signal from an early OFDM symbol interval and send the recorded signal with a time advancement in a latter OFDM symbol interval for generating a fake earliest channel arrival.

Example embodiments of the present disclosure relate to systems, methods, and devices for secure sounding signal without unintentional beamforming effect.

Different antennas send different sounding signals, respectively during the first sounding symbol interval such that there is no unintentional beamforming. In the second symbol interval, the antenna cannot send the same sounding signal as the one in the first symbol interval, which the attacker already knows. Instead, besides the P-matrix phase rotation, a masking signal is applied to all the sounding antennas in the frequency domain i.e. multiplying the masking signal with the sounding signal subcarrier by subcarrier. This masking is common to all antennas so that the differentials between any two antennas' signals remain the same as the ones in the first symbol interval except for the P-matrix phase rotation. Different masking signals are applied in the subsequent symbol intervals, respectively. As a result, there is no unintentional beamforming effect, and the existing antenna multiplexing by the P-matrix can be reused.

The proposed sounding signal structure mitigates the unintentional beamform effect in the existing IEEE 802.11az (".11az") specification draft. Besides, the security is enhanced because the encryption bits are about twice of the existing scheme.

Additional example embodiments of the present disclosure relate to systems, methods, and devices for secure sounding signal for multiple antennas.

In one embodiment, a secure sounding signal system may facilitate two design options. The first one uses the same sounding symbols for all antennas in each sounding symbol interval and changes the sounding symbol for different sounding symbol intervals. This option suffers slightly from the unintentional beamforming effect. The second option addresses the unintentional beamforming effect at the cost of complexity. In the second option, for each sounding symbol interval, each antenna sends a different sounding symbol. In addition, each antenna sends different sounding symbols for different sounding symbol intervals. Because cyclic shift diversity (CSD) is not used for protecting the security, the short training field (STF) needs to be modified from the legacy.

The secure ranging is a key feature for next generation laptop. For example, the user can unlock the laptop screen by the secure ranging between the cell phone and the laptop.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of secure sounding signal, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 13:
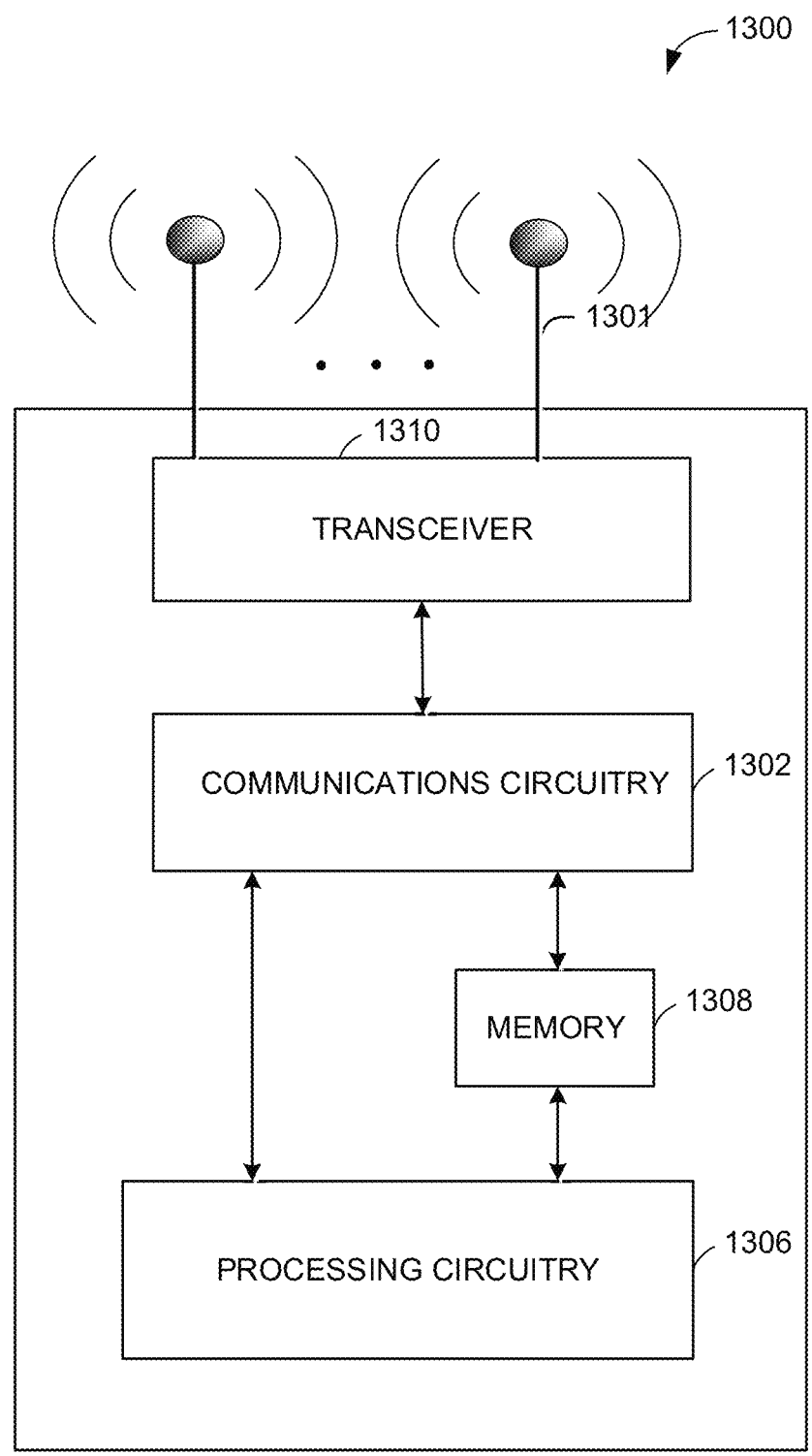
FIG. 13 illustrates a functional diagram of an exemplary communication station that may be suitable for use as a user device, in accordance with one or more example embodiments of the present disclosure.
Figure 14:
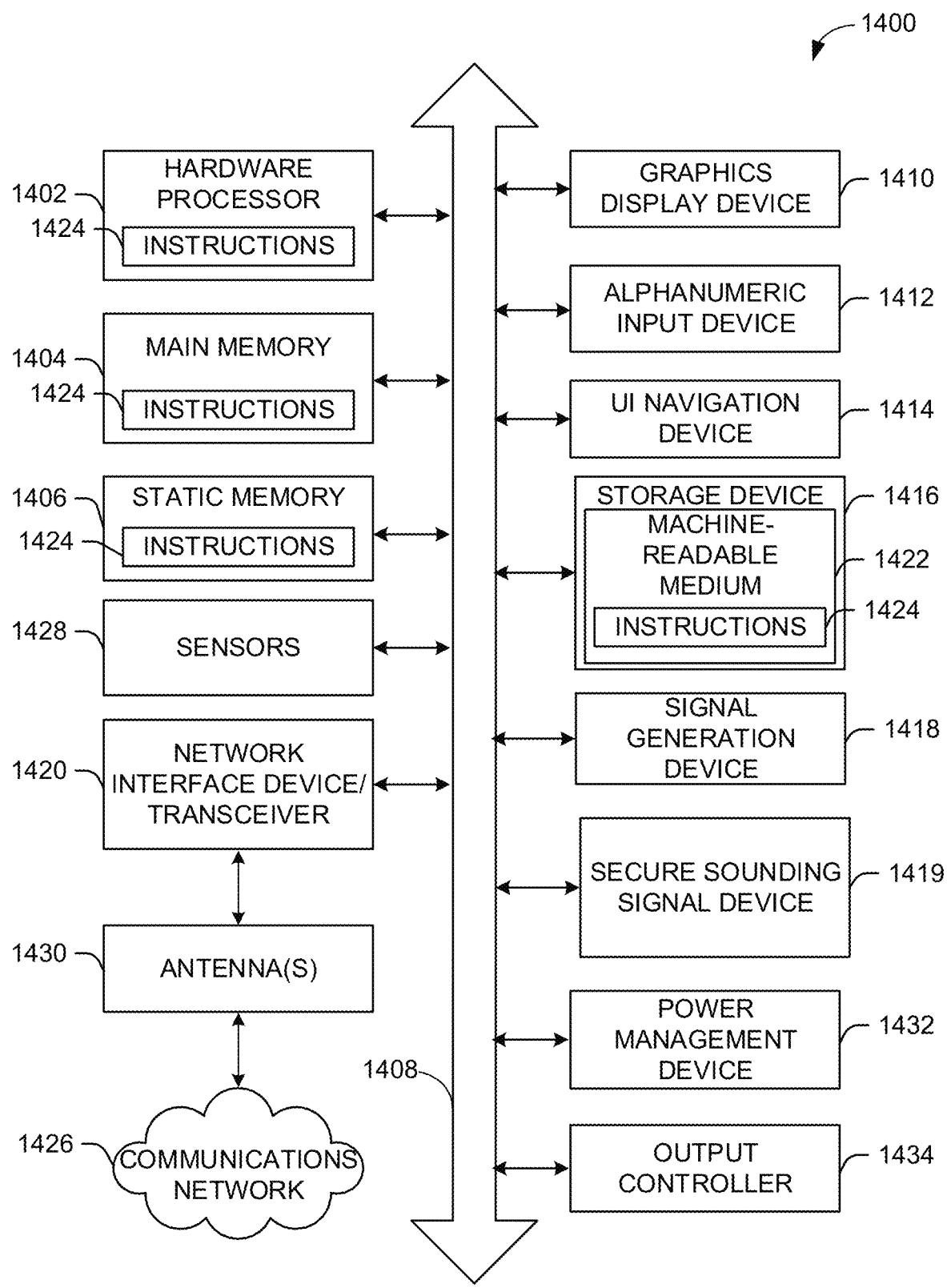
FIG. 14 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 13 and/or the example machine/system of FIG. 14.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device (s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may facilitate secure sounding signal 142 with one or more user devices 120.

It is understood that the above descriptions are for purposes of illustration and are not meant to be limiting.

Figure 2:
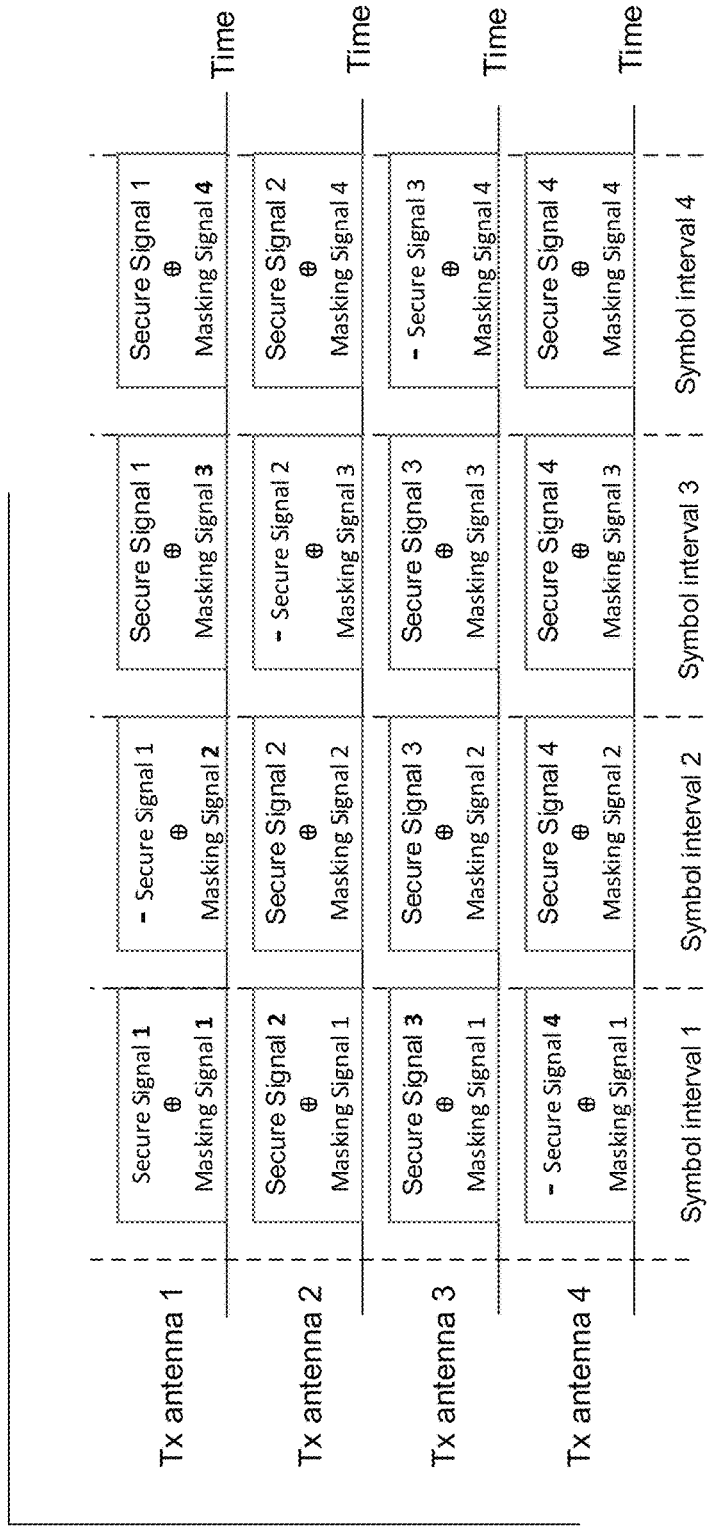
FIGS. 2-3 depict illustrative schematic diagrams for secure sounding signal, in accordance with one or more example embodiments of the present disclosure.
Figure 3:
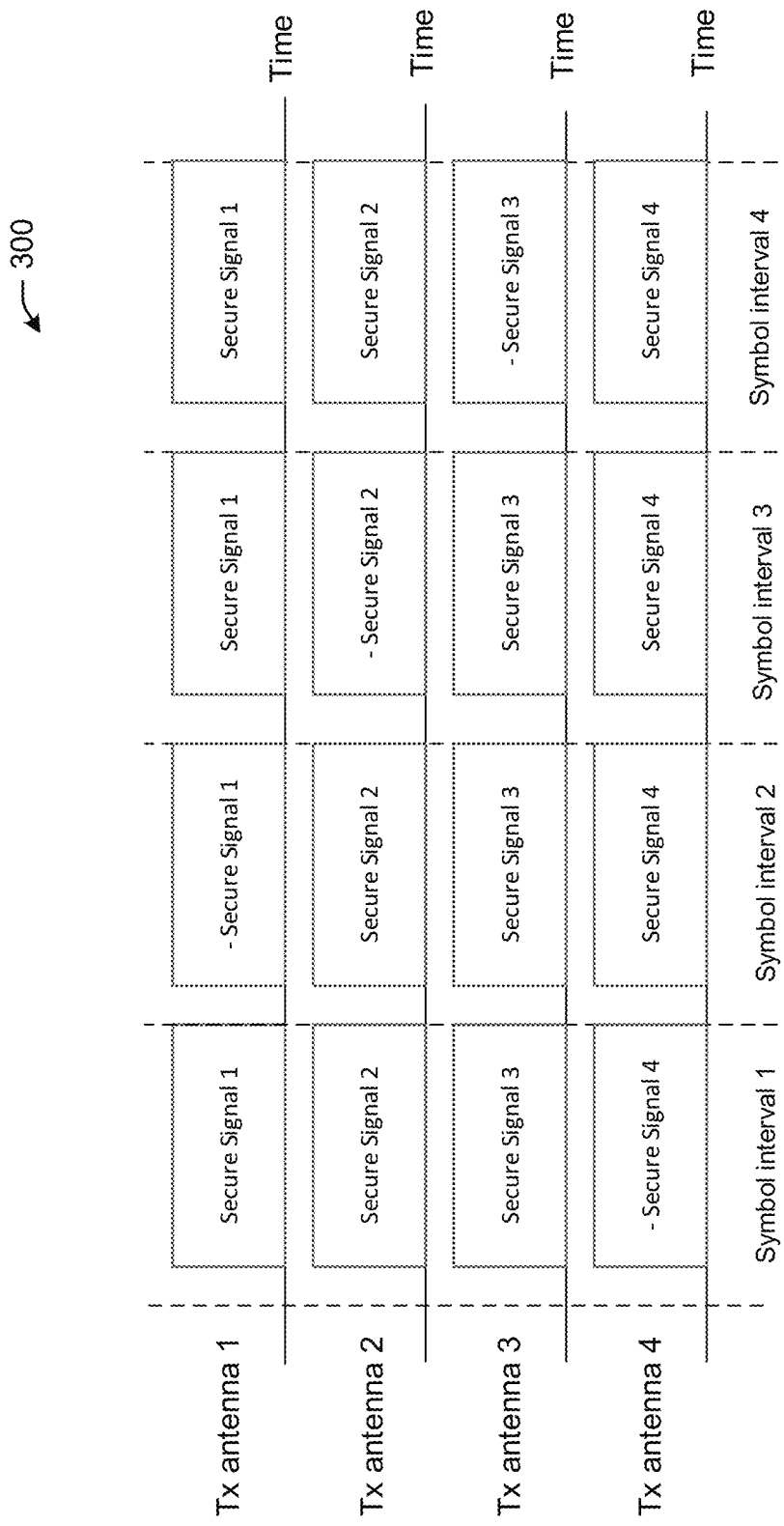

FIGS. 2-3 depict illustrative schematic diagrams for secure sounding signal, in accordance with one or more example embodiments of the present disclosure.

Referring to FIG. 2, there is shown a sounding signal structure for 4 transmit antennas.

In one or more embodiments, a secure sounding signal system may facilitate a structure for the multi-antenna sounding signal 200 is illustrated in FIG. 2 for the case of 4 transmit antennas. The sounding signal for each active subcarrier has three terms: P-matrix phase rotation, secure signal, and masking signal. The phase rotations are illustrated by the negative signs in the $4^{th}$, $1^{st}$, $2^{nd}$ and $3^{rd}$ row for symbol intervals 1, 2, 3, and 4, respectively. The secure signals are different across antennas. Namely, secure signals 1, 2, 3, and 4 are different signals in FIG. 2. Although the secure signals are different across antennas, they remain the same in time, across symbol intervals 1, 2, 3, and 4. In contrast, the masking signals are different across symbol intervals. Namely, masking signals 1, 2, 3, and 4 are different in FIG. 2. Although the masking signals are different across symbol intervals, they remain the same across antennas 1, 2, 3, and 4.

In one or more embodiments, the masking signal for one of the symbol intervals, e.g., the first interval may be skipped since it reduces the complexity without weakening the security protection. Besides frequency domain, the masking signal can be applied in time domain. For example, the antenna signals for a given symbol interval can be filtered by the same filter. The filter operation may be circular convolution. The filter taps may be unknown to the attacker and known to the intended receiving device. Different filters are used for different symbol intervals for providing security protection.

Referring to FIG. 3, there is shown a signal structure 300 after removing the masking signals at the receiving device. The receiving device can demultiplex the received signals from the antennas as follows. For the received signal from each symbol interval, the effect of the masking signal is undone first. For example, in the frequency domain, the spectrum of the received signal is divided by the spectrum of the masking signal for that symbol interval. After undoing the masking signals, the signal structure is illustrated in FIG. 3. This is similar to the legacy high throughput-long training field (LTF), very high throughput (VHT)-LTF, and high efficiency (HE)-LTF structures except different antennas send different LTF signals, respectively. Next, the P-matrix code multiplexing can be undone by multiplying the signals from the symbol intervals with the inverse of the P-matrix. As a result, the signals from different antennas are completely separated at the receiving device. Finally, the receiving device undoes the effect of each secure signal for each transmit antenna. For example, in the frequency domain, the spectrum of the separated signal is divided by the spectrum of the secure signal for that antenna.

It should be noticed that the antennas can be replaced by spatial streams in the proposed scheme. Although the example is for 4 antenna case, the proposed scheme works for all numbers of antennas or spatial streams.

It is understood that the above descriptions are for purposes of illustration and are not meant to be limiting.

FIGS. 4-11 depict illustrative schematic diagrams for secure sounding signal, in accordance with one or more example embodiments of the present disclosure.

Figure 4:
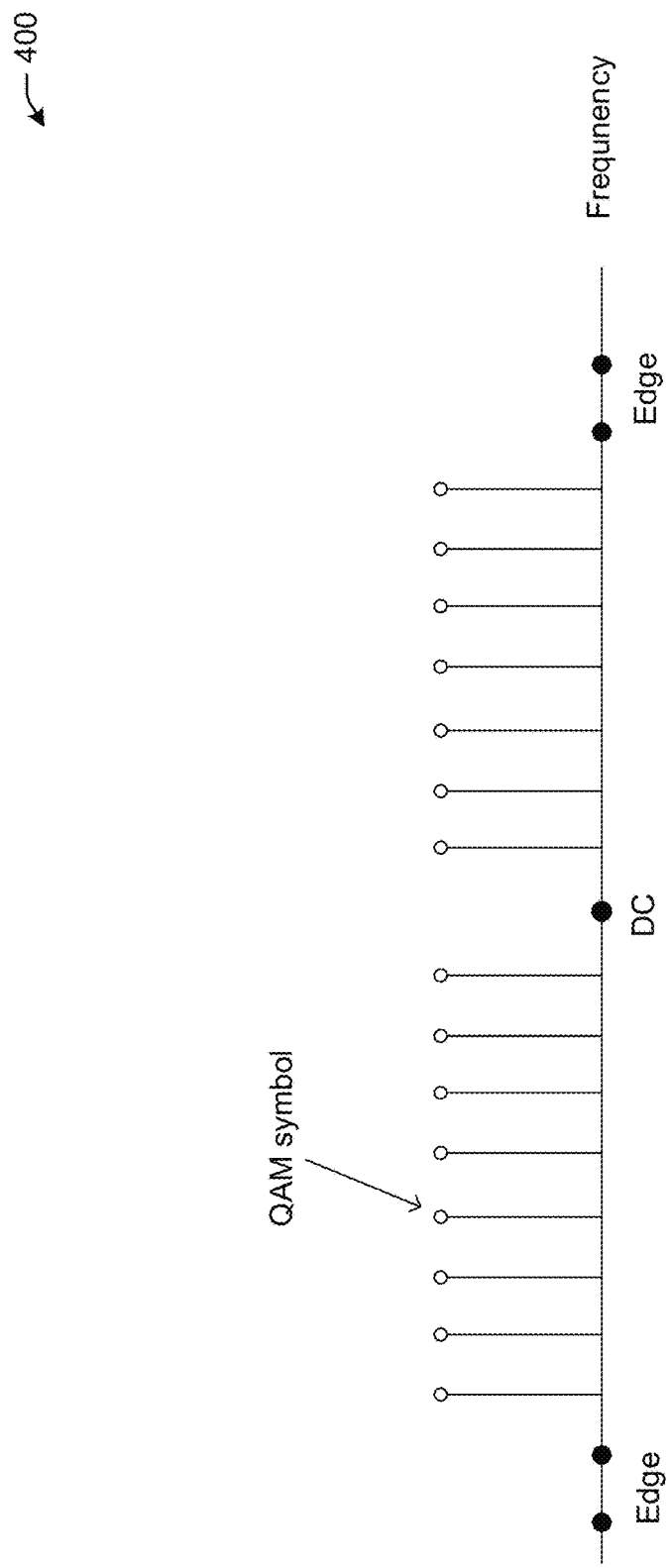
FIGS. 4-11 depict illustrative schematic diagrams for secure sounding signal, in accordance with one or more example embodiments of the present disclosure.

Referring to FIG. 4, there is shown an OFDM-based sounding signal 400.

The existing proposals in IEEE 802.11az are based on orthogonal frequency-division multiplexing (OFDM) modulation as illustrated in FIG. 4. The encryption bits determine a sequence of quadrature amplitude modulation (QAM) symbols that are mapped on the active subcarriers. Although this scheme is of low complexity and high backward compatibility, it is not secure because all the signal parameters, i.e., the phases and amplitudes of the QAM symbols are exposed at the beginning of the sounding symbol such that the attacker can detect them without receiving the whole sounding symbol.

Figure 5:
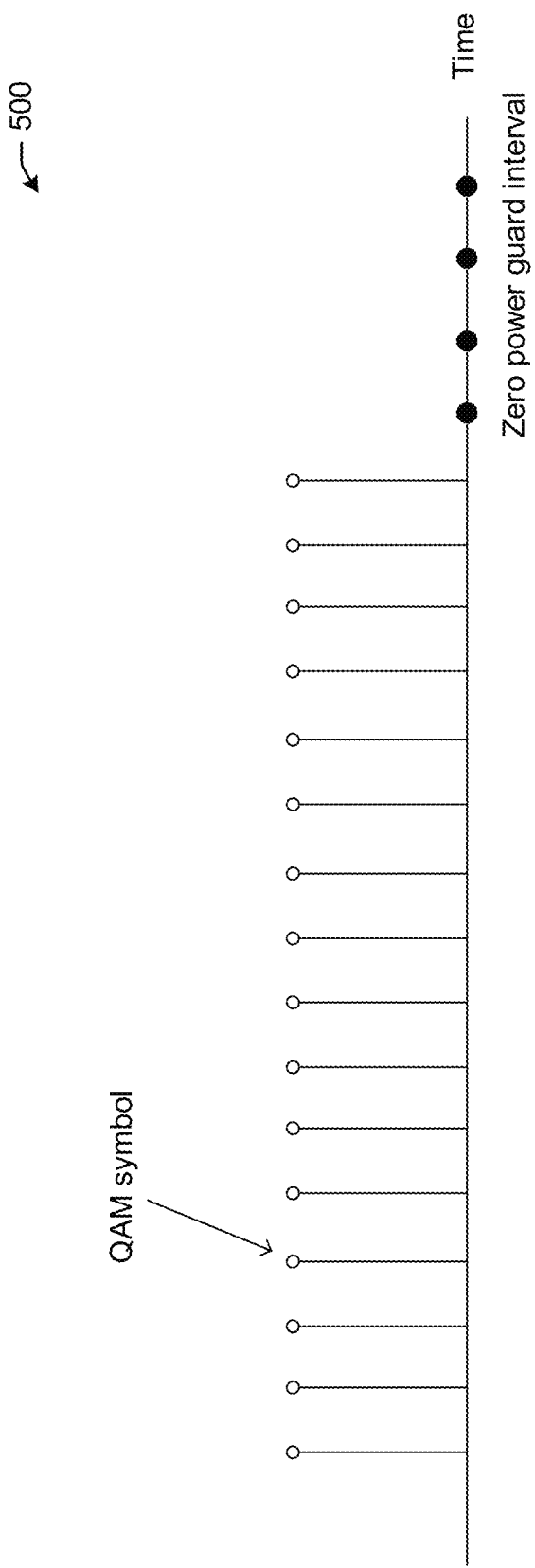

In contrast, time-domain pulse sequence doesn't have this problem as illustrated in FIG. 5.

Referring to FIG. 5, there is shown a pulse-based sounding signal with ideal pulses 500. Namely, the previous portion of the sounding signal doesn't provide information, e.g., phase and amplitude about the remaining portion because the pulses are independent. In reality, the pulse is band limited such that the pulse may not be time limited. Namely, the pulse may have a tail in addition to the main peak as illustrated in FIG. 6.

Figure 6:
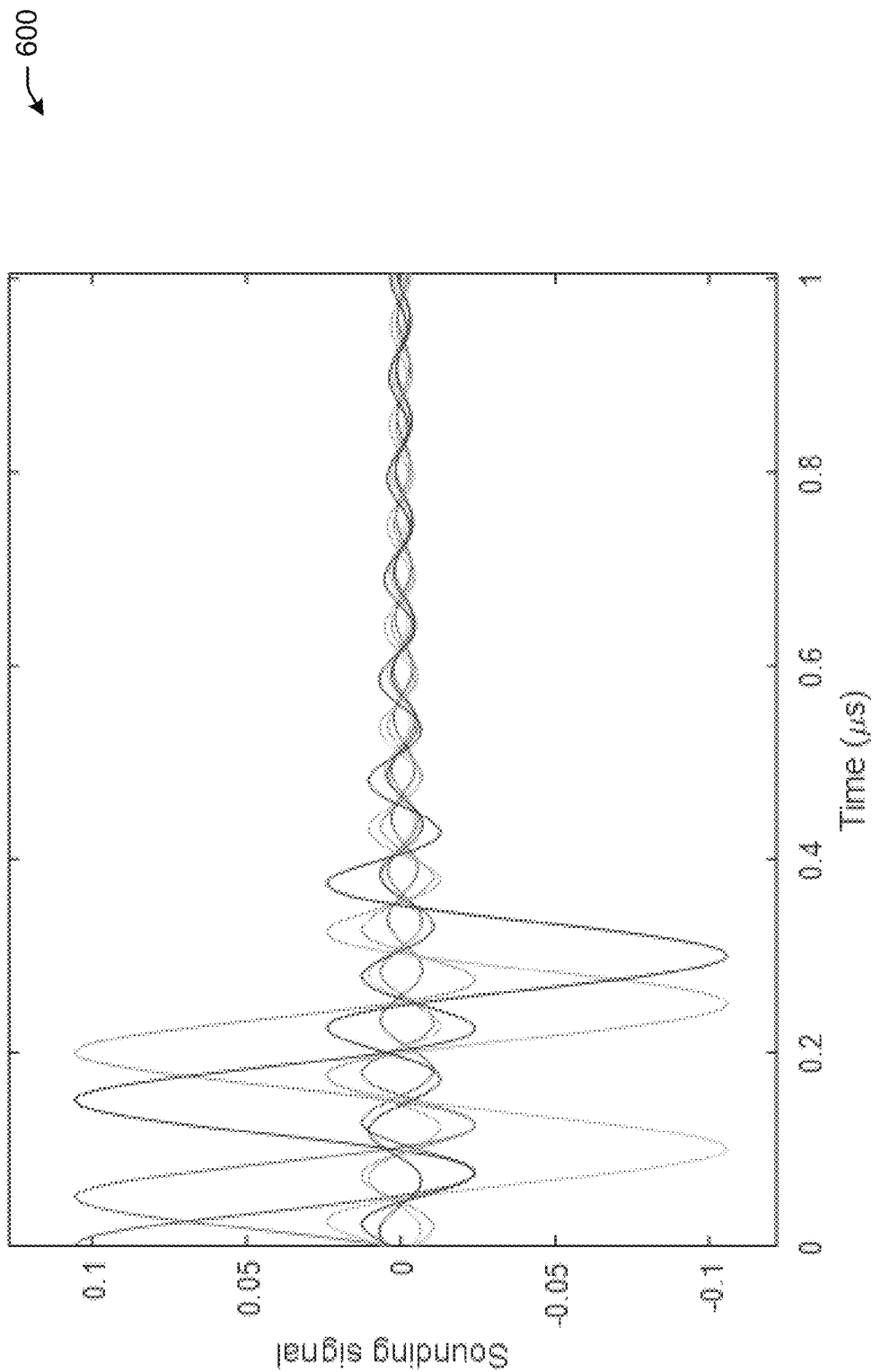

Referring to FIG. 6, there is shown a pulse-based sounding signal with band-limited pulses 600.

Furthermore, the zero power on the DC and edge subcarriers also accounts for the long tail. The time-domain pulse sequence can be generated by DFT pre-coded OFDM or other methods. The pulse can be Nyquist pulse or others. Time-domain pulse sequence is considered. The pulse sequence may or may not have a wraparound structure. In the case of wraparound, the left tail or the preceding part of the first pulse is at the end of the pulse sequence. For example, in FIG. 6, the left half of the first pulse on the left in blue color is wrapped around to the end of the pulse sequence and is not shown on the right in the figure. It should be noticed that the sounding signal waveform may not look like a sequence of separated pulses because the tails of the pulses superimpose each other even though the sounding signal consists of a sequence of pulses.

For supporting multiple antennas, multiple sounding symbols are needed. Several options are listed below.

In the figures of this disclosure, Sequence n, where n=1, 2, 3, and 4, represents a sounding symbol, in which any two portions of the time domain signal of the symbol provide little or no information about each other, and different values of n represents different sounding signals. In the rest of the disclosure, the configuration of 4 transmit antennas may be used as an example to illustrate the idea that can be easily extended to other numbers of antennas. The design options next are mainly for the sounding signal with time-domain pulse sequence. However, the design options are applicable to OFDM-based sounding signal as well. The cyclic shift diversity (CSD) values mentioned in the rest of the disclosure may be the same as those defined in 802.11n/ac/ax/be.

Option 1—Time Sharing.

Figure 7:
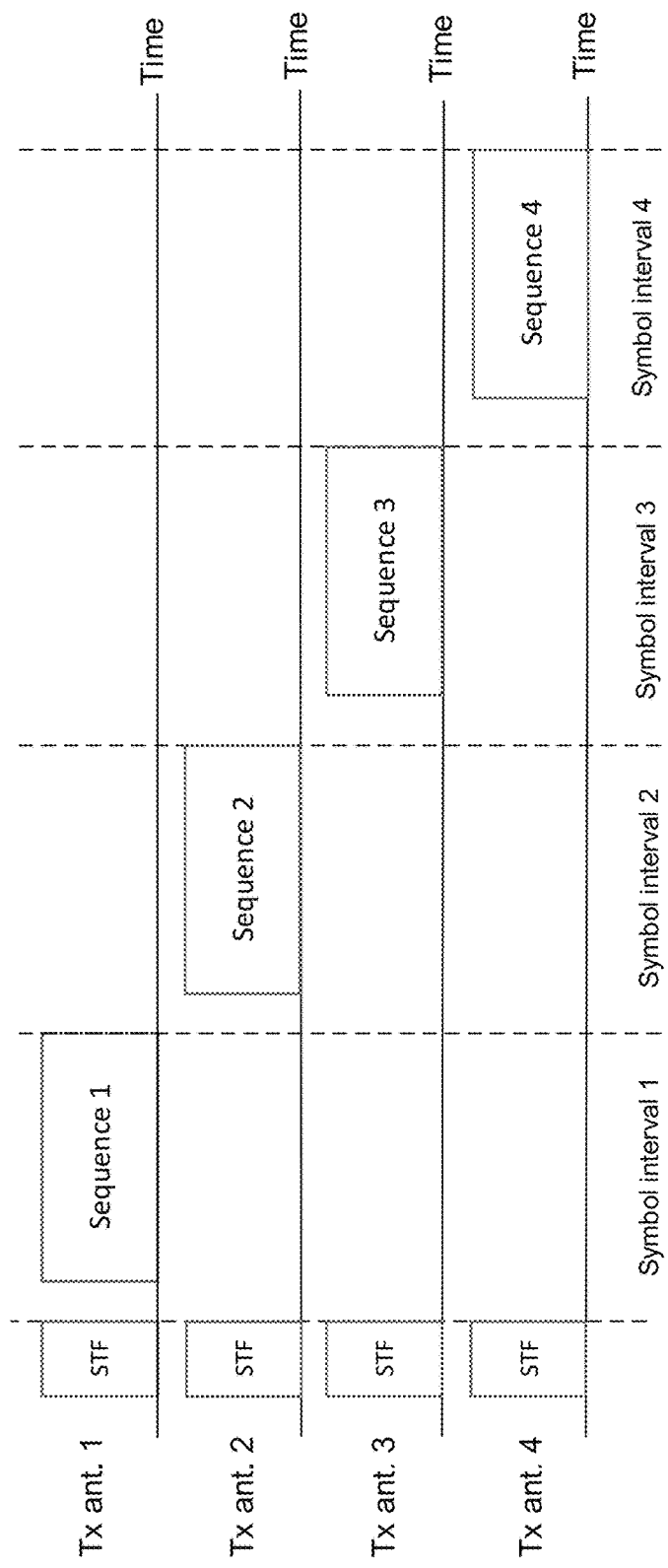

A straightforward design is shown in FIG. 7, where the transmit antennas can share the multiple sounding symbols using time sharing.

Referring to FIG. 7, there is shown a time sharing sounding for multiple antennas 700.

From the left to the right in the figure, the transmit antennas first send a short training field (STF) simultaneously so that the receiver can set the AGC properly. After a zero-power guard interval (GI), the antennas send sounding symbols sequentially, which are denoted by Sequence n in the figure. The sounding symbols sent in different symbol intervals are different so that the attacker can't predict the future sounding signal using the previous sounding signal. Unlike the conventional OFDM symbol with a cyclic prefix, i.e., non-zero power GI, zero-power GIs are inserted between the sounding symbols, as shown in FIG. 7. For the receiver to measure the average received signal power, the STF may be sent to all antennas. In addition, different CSD values may be applied to the STF signals sent by different antennas, respectively such that the sum power of the signals can be measured reliably.

The upside of this option is that receiver doesn't need to buffer all the sounding symbols received in the symbol intervals before estimating the individual channel responses of each transmit antenna. The receiver can estimate the channel response from each transmit antenna to the receive antenna sequentially symbol by symbol. For example, after receiving Sequence 1 in FIG. 7, the receiver can estimate the channel response or the time of arrival (ToA) from Tx antenna 1 to the receive antenna and doesn't need to wait until receiving the other sounding symbols, e.g., Sequence 2.

The downside of this option is that the transmission power is not maximized in some cases. In each symbol interval, only one transmit antenna sends the sounding signal and the other antennas are silent. Therefore, if the power amplifier of each antenna can't send the maximum power allowed by the regulation, the transmission powers of the silent antenna chains are not utilized for maximizing the sounding power. One solution is next.

Option 2—Beamforming

In each symbol interval in FIG. 7, multiple transmit antennas can send the same sounding signal, e.g., a pulse sequence using different or the same beamforming weights. As long as there is no time shift among the transmissions, it is secure. In other words, the sounding transmitter may apply a set of beamforming (or antenna) weights on the antennas for sending the sounding symbol simultaneously. The beamforming (or antenna) weights may be determined by the sounding transmitter or the sounding receiver. In different symbol intervals, different sets of beamforming weights may be applied so that the radiation patterns are different over the sounding symbols for achieving diversity gain.

Figure 8:
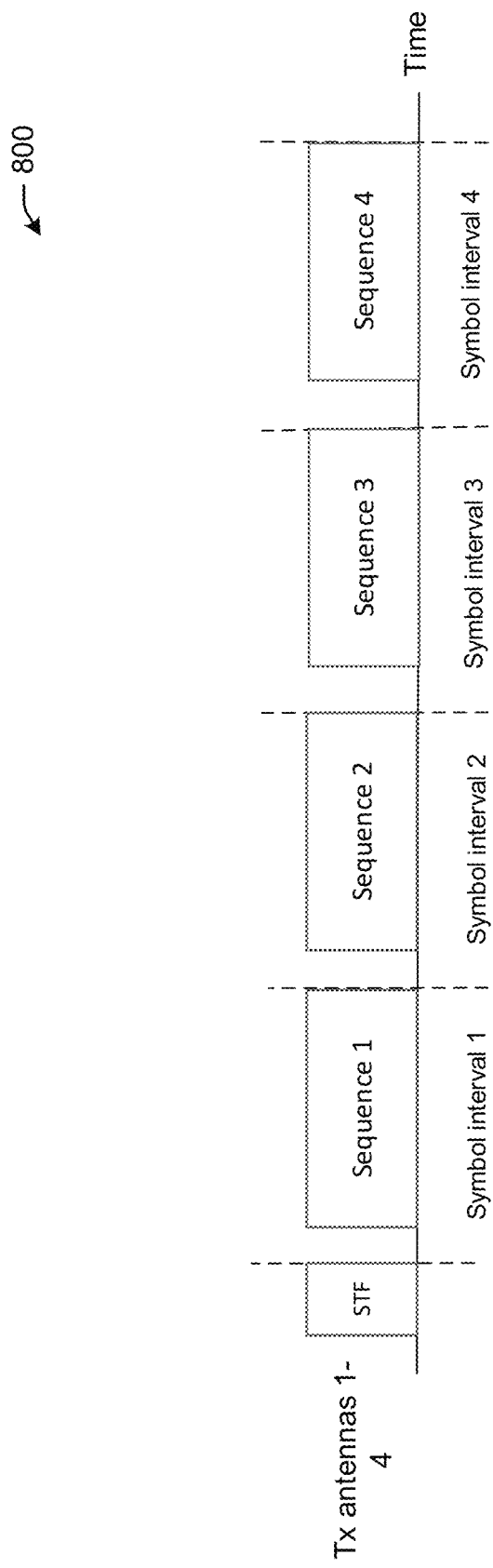
Figure 9:
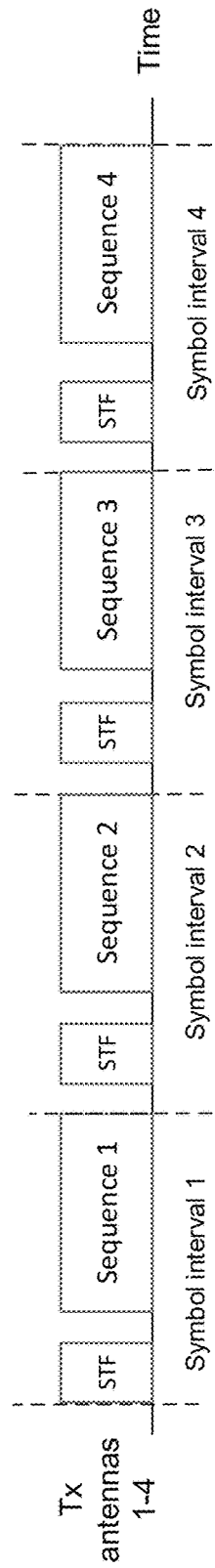

The idea is illustrated in FIG. 8 and FIG. 9. In FIG. 8, the beamformed sounding symbols share the same short training field (STF) for AGC setting.

Referring to FIG. 8, there is shown a beamformed sounding signals 800 in multiple symbol intervals sharing the same short training field for AGC setting.

The upside of sharing the STF is the reduction of transmission time. The downside is that the AGC setting is different from the normal. Since the different beamforming weights may cause significant power fluctuation in the received signal over the individual symbol intervals in FIG. 8, the AGC may need to be set properly so that the AGC setting doesn't cause significant overflow and underflow in the ADC. Because the power fluctuation is greater than the one in normal PPDU, the sounding receiver may need to reserve ADC margins when setting the AGC especially for receiving the multi-antenna secure NDP. This increases the complexity. In FIG. 8, the beamforming weights can be the P-matrix codes used by 802.11n/ac/ax. For the receiver to measure the average received signal power, the STF may be sent by all the beamforming vectors $w_1, w_2, \ldots, w_4$ used in the symbol intervals, respectively, where the vectors $w_1, w_2, \ldots, w_4$ can be the P-matrix codes or the other columns (or rows) of a unitary matrix, and each beamforming vector sends on spatial stream. In addition, different cyclic shift diversity (CSD) values may be applied to the STF signals sent by different beamforming vectors, respectively such that the sum power of the beamformed signals can be measured. When P-matrix encoding is applied to the sounding symbols, the conventional STF transmission applies CDS to each antenna, not each spatial stream sent by the P-matrix columns (or rows), respectively. The reason is that each antenna sends on spatial stream with a different CSD shift in the conventional. In the proposed, each spatial stream is sent by all antennas using the P-matrix code, and the CSD shift is applied to the spatial stream, not the antenna for the STF.

Referring to FIG. 9, there is shown a beamformed sounding signals 900 in multiple symbol intervals with individual short training fields for AGC setting.

The scheme in FIG. 9 has a complexity lower than that in FIG. 8 at the cost of a longer transmission time. Each sounding symbol, i.e., each of the Sequence n in FIG. 9, has its own STF for setting the AGC properly. Following each STF, a zero-power guard interval (GI) is applied to accommodate delayed multipaths. The STF is sent with the same beamforming weights as the ones used by the following sounding symbol. Namely, if the sounding symbol is beamformed, then the STF is beamformed in the same way. Otherwise, both are not beamformed and are sent using the same antenna(s). The beamforming vectors can be the P-matrix codes or other beamforming weights. Since the STF is specifically for the sounding symbol right after, there is no need to apply the CSD on the STF.

Option 3—P-Matrix Multiplexing with Unintentional Beamforming Effect

This option maximizes the backward compatibility by reusing the P-matrix code multiplexing. One of the changes is that cyclic shift diversity (CSD) is not applied to the sounding symbols because the CSD provides the attacker the sounding information that hasn't been sent yet by an antenna. The CSD in the legacy 802.11n/ac/ax is for mitigating the power fluctuation in the received signal caused by unintentional beamforming. Since this option doesn't use the CSD in the sounding symbols, the receiver needs to reserve additional AGC headroom for preventing the ADC from overflow and underflow due to the unintentional beamforming effect in the sounding symbols. This option is similar to the option in FIG. 8. The P-matrix codes may be treated as beamforming vectors, e.g., with binary +/−1s.

For the receiver to measure the average received signal power, the STF may be sent by all the beamforming vectors $w_1, w_2, \ldots, w_4$ used in the symbol intervals, respectively, where the beamforming vectors are the P-matrix codes and each beamforming vector sends one spatial stream. In addition, different cyclic shift diversity (CSD) values may be applied to the STF signals sent by different beamforming vectors, respectively such that the sum power of the beamformed signals can be measured. Namely, the P-matrix code used in each symbol interval is treated as a beamforming vector sending a spatial stream, whose payload is the STF. Alternatively, for the ease of implementation and at the cost of AGC performance, the different CSD values may be applied to different Tx antennas instead of different spatial streams when the STF is sent. This is the conventional way but not the best one.

Figure 10:
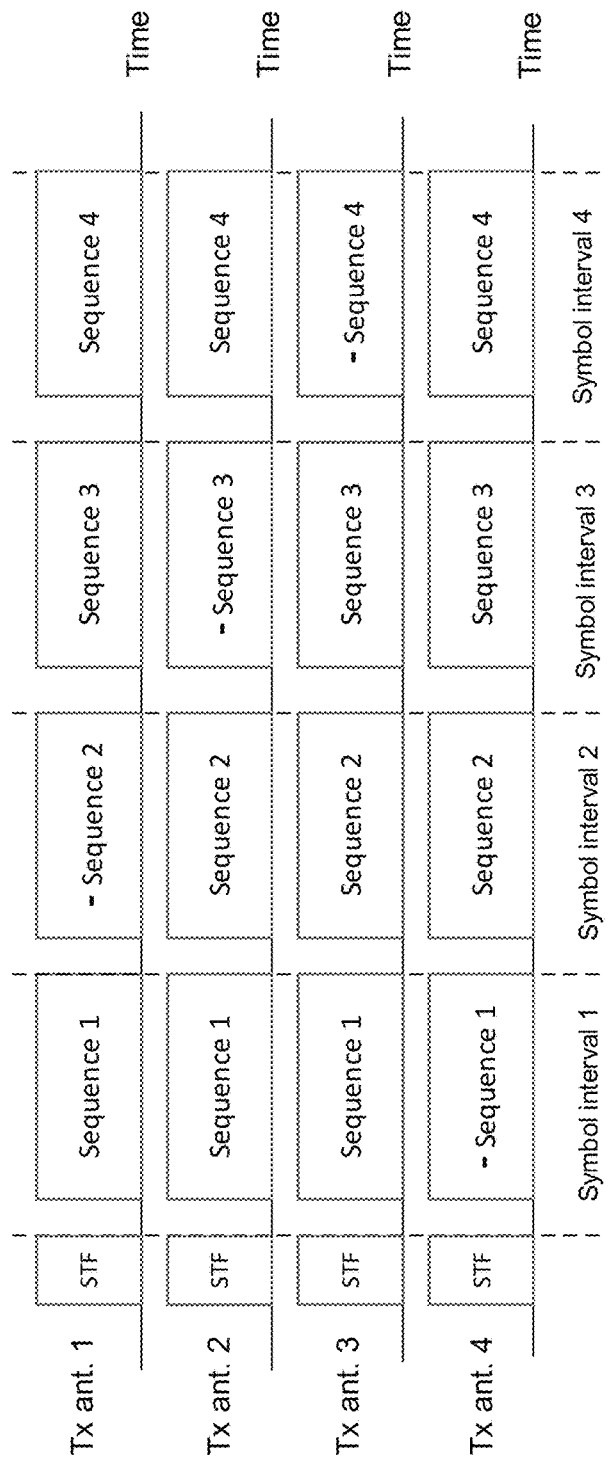

Referring to FIG. 10, there is shown a P-matrix code multiplexing with unintentional beamforming effect 1000.

Figure 11:
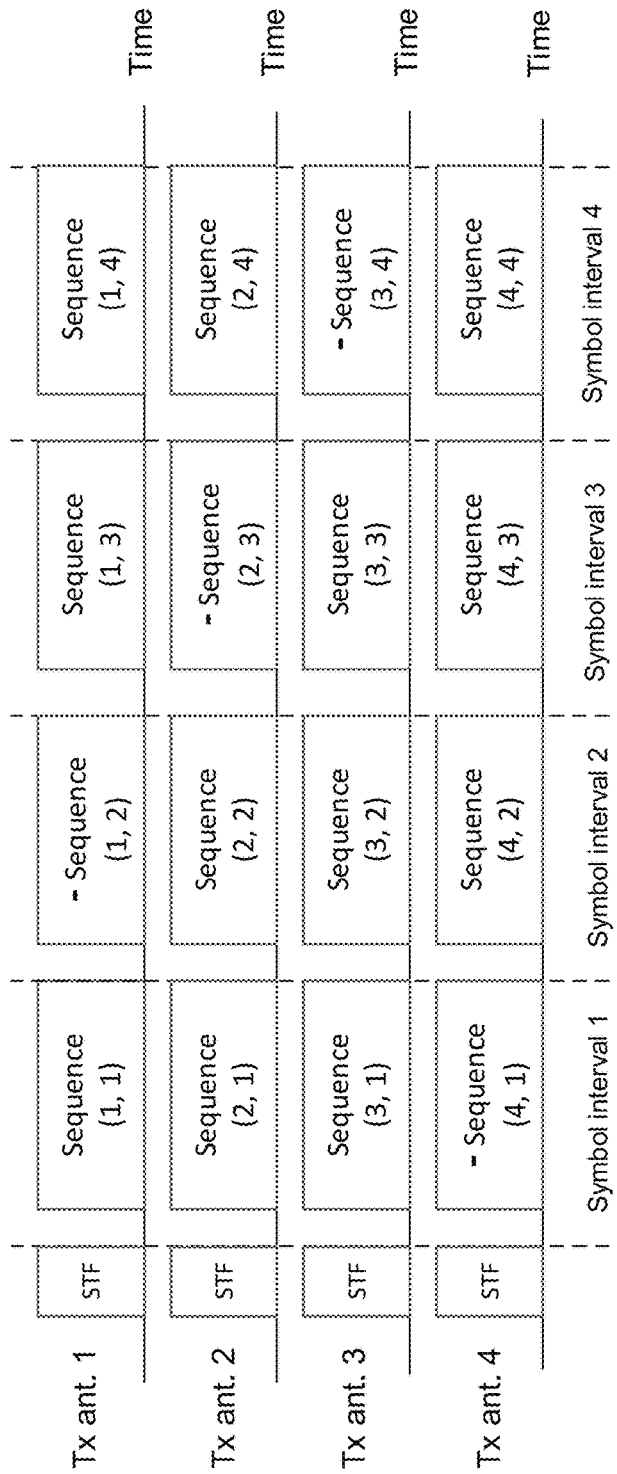

If additional beamforming other than the P-matrix encoding is applied, the beamforming is first applied to multiple physical antennas forming the virtual antennas (or antenna ports), e.g., Tx antennas 1-4 in FIGS. 7, 10, and 11 and then the P-matrix encoding is applied to the virtual antennas or antenna ports. The different CSD values may be applied to the STF spatial streams sent by the P-matrix codes or may be applied to the virtual antennas, respectively.

Option 4—P-Matrix Multiplexing without Unintentional Beamforming Effect.

The previous option suffers from the received power fluctuation across the symbol intervals. Because it is undesirable to apply different CSD values to different antennas for the same sounding symbol, different antennas may send different sounding symbols simultaneously as illustrated in FIG. 11. In FIG. 11, the STF may be sent using different CSD values. The different CSD values may be applied to different physical or virtual antennas, respectively.

Referring to FIG. 11, there is shown a spatial multiplexing without unintentional beamforming effect 1100.

In FIG. 11, the sounding symbol is denoted by Sequence (i, j), where i and j are the antenna index and the symbol interval index, respectively. The minus signs in FIG. 11 represent the application of the P-matrix codes. It should be noticed that the P-matrix is not essential for enabling the simultaneous transmissions of the transmit antennas and may not be applied in FIG. 11. In general, what is required in this option is that the sounding symbol sent by each antenna at each interval is different. Namely, ignoring the minus signs in FIG. 11, Sequence (i, j)=Sequence (m, n) only if i=m and j=n. This is the most secure sounding scheme since no information is repeated in time and space. In addition, it doesn't suffer from the unintentional beamforming effect, i.e., the received power fluctuation because different antennas always send different signals. The estimation of the channel response can be done as follows.

The receiver wants to estimate the channel responses for an active subcarrier, e.g., subcarrier q. Using the example in FIG. 11 and assuming the P-matrix codes are not applied, where there are 4 transmit antennas, the signal model can be written as $$\begin{bmatrix} y_1 \\ y_2 \\ y_3 \\ y_4 \end{bmatrix} = \begin{bmatrix} s_{1,1} & s_{2,1} & s_{3,1} & s_{4,1} \\ s_{1,2} & s_{2,2} & s_{3,2} & s_{4,2} \\ s_{1,3} & s_{2,3} & s_{3,3} & s_{4,3} \\ s_{1,4} & s_{2,4} & s_{3,4} & s_{4,4} \end{bmatrix} \begin{bmatrix} h_1 \\ h_2 \\ h_3 \\ h_4 \end{bmatrix} + \begin{bmatrix} n_1 \\ n_2 \\ n_3 \\ n_4 \end{bmatrix}, \quad (1)$$

where $$\begin{bmatrix} y_1 \\ y_2 \\ y_3 \\ y_4 \end{bmatrix}$$

consists of the received signals on the subcarrier over 4 symbol intervals, $$\begin{bmatrix} h_1 \\ h_2 \\ h_3 \\ h_4 \end{bmatrix}$$

is the 4 channel responses from the 4 transmit antennas to the receive antenna under estimation, $$\begin{bmatrix} n_1 \\ n_2 \\ n_3 \\ n_4 \end{bmatrix}$$

is the additive noises on the 4 received signals on the 4 antennas, $s_{i,j}$ is the frequency response (or spectrum) of sounding symbol Sequence (i, j) of the subcarrier. There are various ways to estimate the channel responses in (1). Using linear estimators, e.g., zero-forcing and MMSE, the channel responses can be estimated as $$\hat{h} = Wy, \quad (2)$$

where $\hat{h}$ denotes the estimates of $$h \triangleq \begin{bmatrix} h_1 \\ h_2 \\ h_3 \\ h_4 \end{bmatrix}; y \triangleq \begin{bmatrix} y_1 \\ y_2 \\ y_3 \\ y_4 \end{bmatrix}, S \triangleq \begin{bmatrix} s_{1,1} & s_{2,1} & s_{3,1} & s_{4,1} \\ s_{1,2} & s_{2,2} & s_{3,2} & s_{4,2} \\ s_{1,3} & s_{2,3} & s_{3,3} & s_{4,3} \\ s_{1,4} & s_{2,4} & s_{3,4} & s_{4,4} \end{bmatrix} \text{ and } n \triangleq \begin{bmatrix} n_1 \\ n_2 \\ n_3 \\ n_4 \end{bmatrix};$$

$$W = S^{-1} \quad (3)$$

for zero-forcing estimator and $$W = R_h S^H (SR_h S^H + R_n)^{-1} \quad (4)$$

For MMSE estimator, respectively; $R_h \triangleq E(hh^H)$ and $R_n \triangleq E(nn^H)$ are the covariance matrixes of the channel responses and noises, respectively.

The complexity of (3) and (4) can be high for large matrixes. For reducing the complexity, Option 4 may be used together with other options in the disclosure. For example, since the inversion of 2×2 matrix is of a low complexity, the antennas or antenna ports may be divided into groups whose numbers of antennas is limited to a small number, e.g., 2. The antennas of each group can share the symbol intervals using spatial multiplexing as shown in FIG. 11. On a higher level, the antenna groups can share the symbol intervals using time sharing as illustrated in FIGS. 7-9 without the security loss or using orthogonal matrix code multiplexing such as the P-matrix code at the cost of security.

For reducing the receiver complexity, an orthogonal matrix like the P-matrix may be applied to the sounding symbols as illustrated in FIG. 11, where the minus signs represent the application of the P-matrix codes. In addition, some structure may be imposed to the sounding symbols. The complexity reduction may be at the cost of the security. Some examples are described as follows. The orthogonal matrix may be the P-matrix for maximizing the backward compatibility. Other matrixes with finite alphabet such as Hadamard matrix may also be used for reducing the complexity. Furthermore, for avoiding the matrix inversion, the frequency response or spectrum of the sounding symbols on each active subcarrier other than the pilot subcarriers in FIG. 11 may satisfy:

$$s_{i,j} = a_{j,k} s_{i,k}, \quad (5)$$

For all antennas, i.e., i=1, 2, 3, 4 and all sounding symbol intervals, i.e., j,k=1, 2, 3, 4. The term $a_{j,k}$ can be treated as a frequency domain mask and only varies with the subcarrier index and symbol interval indexes. It should be noticed that the term $a_{j,k}$ doesn't vary with the antenna index. Namely, for each sounding symbol interval, the frequency domain masking remains the same for all antennas. One example of the masking is the randomized binary +1/−1, i.e., random phase flipping on the subcarriers. For another example, for each sounding symbol interval, the same amount of cyclic shift may be applied to all the sounding symbols and different amounts of cyclic shift are used for different sounding symbol intervals, respectively. The frequency mask of this cyclic shift in time domain is a linear phase shift in frequency domain. Although the frequency domain masks are unknown to the attacker, the security is weakened because the underlying sounding symbols remains the same across symbol intervals. As a result, the attacker can make use of this structure and the signals transmitted in the early symbol intervals to predict the sounding signals in the latter symbol intervals. It is understood that the above descriptions are for purposes of illustration and are not meant to be limiting.

Figure 12:
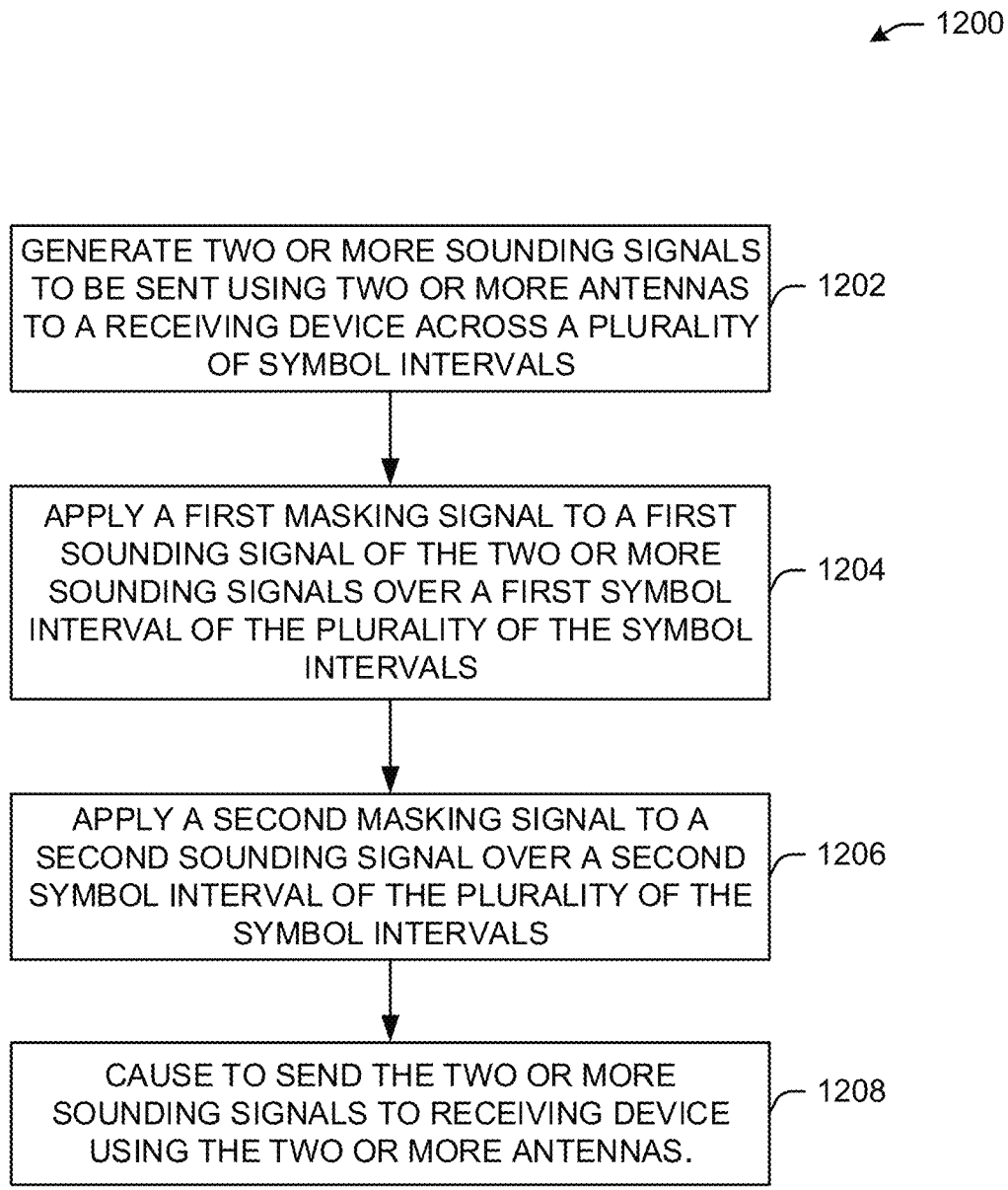
FIG. 12 illustrates a flow diagram of a process for an illustrative secure sounding signal system, in accordance with one or more example embodiments of the present disclosure.

FIG. 12 illustrates a flow diagram of illustrative process 1200 for a secure sounding signal system, in accordance with one or more example embodiments of the present disclosure.

At block 1202, a device (e.g., the user device(s) 120 and/or the AP 102 of FIG. 1) may generate two or more sounding signals to be sent using two or more antennas to a receiving device across a plurality of symbol intervals. The sounding signals may be different across the one or antennas. The same sounding signal may be maintained across the plurality of the symbol intervals. The two or more sounding signals may be generated using different masking signals. The device may apply a p-matrix phase rotation to the two or more sounding signals. An inverse p-matrix may be used by the receiving device to recover original sounding signals.

At block 1204, the device may apply a first masking signal to a first sounding signal of the two or more sounding signals over a first symbol interval of the plurality of the symbol intervals.

At block 1206, the device may apply a second masking signal to a second sounding signal over a second symbol interval of the plurality of the symbol intervals. The masking signals may be different across the plurality of the symbol intervals. The same masking signal may be maintained across the two or more antennas.

At block 1208, the device may cause to send the two or more sounding signals to receiving device using the two or more antennas.

It is understood that the above descriptions are for purposes of illustration and are not meant to be limiting.

FIG. 13 shows a functional diagram of an exemplary communication station 1300, in accordance with one or more example embodiments of the present disclosure. In one embodiment, FIG. 13 illustrates a functional block diagram of a communication station that may be suitable for use as an AP 102 (FIG. 1) or a user device 120 (FIG. 1) in accordance with some embodiments. The communication station 1300 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1300 may include communications circuitry 1302 and a transceiver 1310 for transmitting and receiving signals to and from other communication stations using one or more antennas 1301. The communications circuitry 1302 may include circuitry that can operate the physical layer (PHY) communications and/or medium access control (MAC) communications for controlling access to the wireless medium, and/or any other communications layers for transmitting and receiving signals. The communication station 1300 may also include processing circuitry 1306 and memory 1308 arranged to perform the operations described herein. In some embodiments, the communications circuitry 1302 and the processing circuitry 1306 may be configured to perform operations detailed in the above figures, diagrams, and flows.

In accordance with some embodiments, the communications circuitry 1302 may be arranged to contend for a wireless medium and configure frames or packets for communicating over the wireless medium. The communications circuitry 1302 may be arranged to transmit and receive signals. The communications circuitry 1302 may also include circuitry for modulation/demodulation, upconversion/downconversion, filtering, amplification, etc. In some embodiments, the processing circuitry 1306 of the communication station 1300 may include one or more processors. In other embodiments, two or more antennas 1301 may be coupled to the communications circuitry 1302 arranged for sending and receiving signals. The memory 1308 may store information for configuring the processing circuitry 1306 to perform operations for configuring and transmitting message frames and performing the various operations described herein. The memory 1308 may include any type of memory, including non-transitory memory, for storing information in a form readable by a machine (e.g., a computer). For example, the memory 1308 may include a computer-readable storage device, read-only memory (ROM), random-access memory (RAM), magnetic disk storage media, optical storage media, flash-memory devices and other storage devices and media.

In some embodiments, the communication station 1300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1300 may include one or more antennas 1301. The antennas 1301 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1300 may include one or more of a keyboard, a display, a non-volatile memory port, multiple antennas, a graphics processor, an application processor, speakers, and other mobile device elements. The display may be an LCD screen including a touch screen.

Although the communication station 1300 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1300 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1300 may include one or more processors and may be configured with instructions stored on a computer-readable storage device.

FIG. 14 illustrates a block diagram of an example of a machine 1400 or system upon which any one or more of the techniques (e.g., methodologies) discussed herein may be performed. In other embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environments. The machine 1400 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408. The machine 1400 may further include a power management device 1432, a graphics display device 1410, an alphanumeric input device 1412 (e.g., a keyboard), and a user interface (UI) navigation device 1414 (e.g., a mouse). In an example, the graphics display device 1410, alphanumeric input device 1412, and UI navigation device 1414 may be a touch screen display. The machine 1400 may additionally include a storage device (i.e., drive unit) 1416, a signal generation device 1418 (e.g., a speaker), a secure sounding signal device 1419, a network interface device/transceiver 1420 coupled to antenna(s) 1430, and one or more sensors 1428, such as a global positioning system (GPS) sensor, a compass, an accelerometer, or other sensor. The machine 1400 may include an output controller 1434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1402 for generation and processing of the baseband signals and for controlling operations of the main memory 1404, the storage device 1416, and/or the secure sounding signal device 1419. The baseband processor may be provided on a single radio card, a single chip, or an integrated circuit (IC).

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within the static memory 1406, or within the hardware processor 1402 during execution thereof by the machine 1400. In an example, one or any combination of the hardware processor 1402, the main memory 1404, the static memory 1406, or the storage device 1416 may constitute machine-readable media.

The secure sounding signal device 1419 may carry out or perform any of the operations and processes (e.g., process 1200) described and shown above.

It is understood that the above are only a subset of what the secure sounding signal device 1419 may be configured to perform and that other functions included throughout this disclosure may also be performed by the secure sounding signal device 1419.

While the machine-readable medium 1422 is illustrated as a single medium, the term "machine-readable medium" may include a single medium or multiple media (e.g., a centralized or distributed database, and/or associated caches and servers) configured to store the one or more instructions 1424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1400 and that cause the machine 1400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1424 may further be transmitted or received over a communications network 1426 using a transmission medium via the network interface device/transceiver 1420 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1420 may include one or more physical jacks (e.g., Ethernet, coaxial, or phone jacks) or one or more antennas to connect to the communications network 1426. In an example, the network interface device/transceiver 1420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1400 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 15:
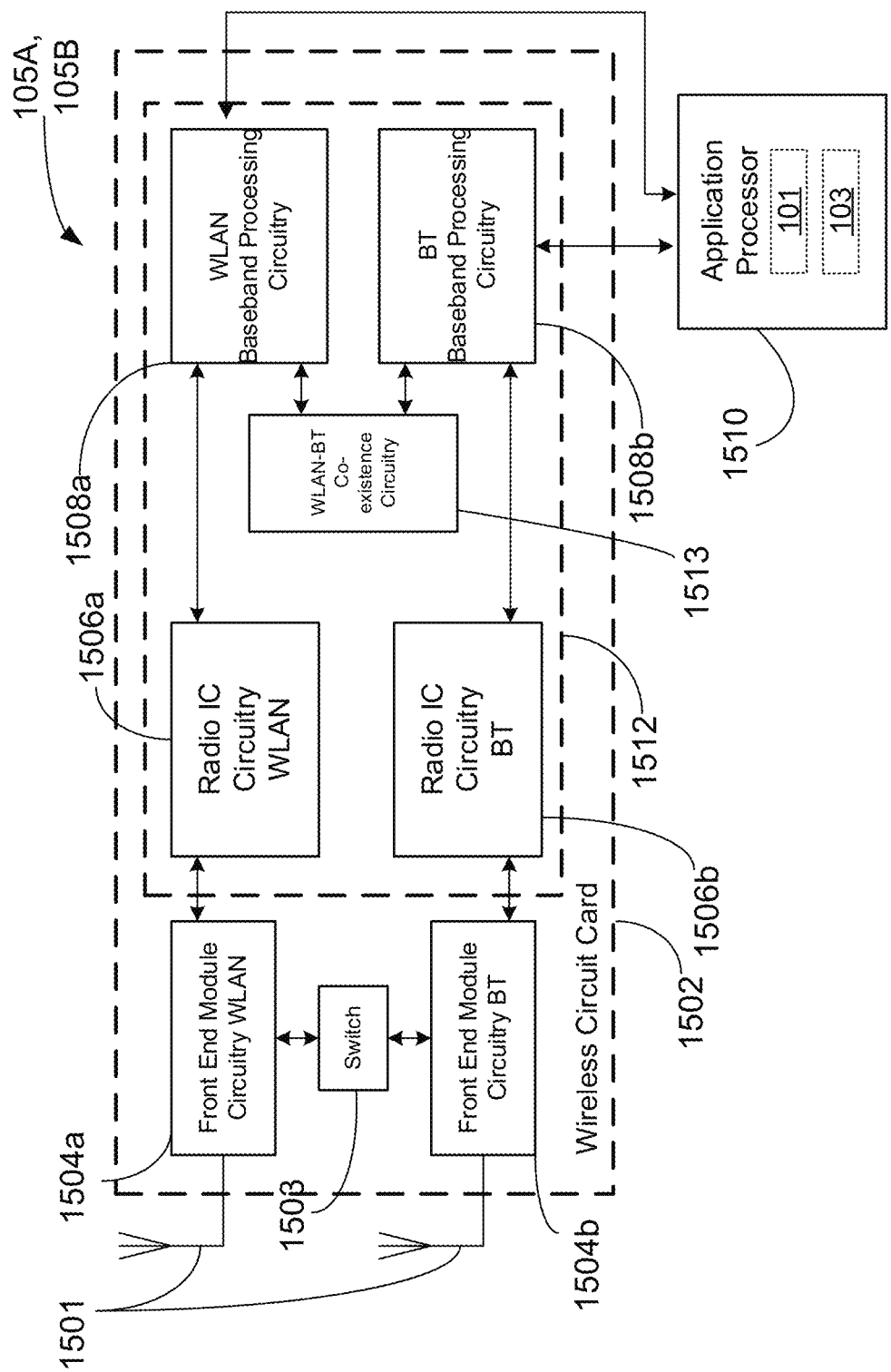
FIG. 15 is a block diagram of a radio architecture in accordance with some examples.

FIG. 15 is a block diagram of a radio architecture 105A, 105B in accordance with some embodiments that may be implemented in any one of the example AP(s) 102 and/or the example user device(s) 120 of FIG. 1. Radio architecture 105A, 105B may include radio front-end module (FEM) circuitry 1504a-b, radio IC circuitry 1506a-b and baseband processing circuitry 1508a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1504a-b may include a WLAN or Wi-Fi FEM circuitry 1504a and a Bluetooth (BT) FEM circuitry 1504b. The WLAN FEM circuitry 1504a may include a receive signal path comprising circuitry configured to operate on WLAN RF signals received from one or more antennas 1501, to amplify the received signals and to provide the amplified versions of the received signals to the WLAN radio IC circuitry 1506a for further processing. The BT FEM circuitry 1504b may include a receive signal path which may include circuitry configured to operate on BT RF signals received from one or more antennas 1501, to amplify the received signals and to provide the amplified versions of the received signals to the BT radio IC circuitry 1506b for further processing. FEM circuitry 1504a may also include a transmit signal path which may include circuitry configured to amplify WLAN signals provided by the radio IC circuitry 1506a for wireless transmission by one or more of the antennas 1501. In addition, FEM circuitry 1504b may also include a transmit signal path which may include circuitry configured to amplify BT signals provided by the radio IC circuitry 1506b for wireless transmission by the one or more antennas. In the embodiment of FIG. 15, although FEM 1504a and FEM 1504b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1506a-b as shown may include WLAN radio IC circuitry 1506a and BT radio IC circuitry 1506b. The WLAN radio IC circuitry 1506a may include a receive signal path which may include circuitry to down-convert WLAN RF signals received from the FEM circuitry 1504a and provide baseband signals to WLAN baseband processing circuitry 1508a. BT radio IC circuitry 1506b may in turn include a receive signal path which may include circuitry to down-convert BT RF signals received from the FEM circuitry 1504b and provide baseband signals to BT baseband processing circuitry 1508b. WLAN radio IC circuitry 1506a may also include a transmit signal path which may include circuitry to up-convert WLAN baseband signals provided by the WLAN baseband processing circuitry 1508a and provide WLAN RF output signals to the FEM circuitry 1504a for subsequent wireless transmission by the one or more antennas 1501. BT radio IC circuitry 1506b may also include a transmit signal path which may include circuitry to up-convert BT baseband signals provided by the BT baseband processing circuitry 1508b and provide BT RF output signals to the FEM circuitry 1504b for subsequent wireless transmission by the one or more antennas 1501. In the embodiment of FIG. 15, although radio IC circuitries 1506a and 1506b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1508a-b may include a WLAN baseband processing circuitry 1508a and a BT baseband processing circuitry 1508b. The WLAN baseband processing circuitry 1508a may include a memory, such as, for example, a set of RAM arrays in a Fast Fourier Transform or Inverse Fast Fourier Transform block (not shown) of the WLAN baseband processing circuitry 1508a. Each of the WLAN baseband circuitry 1508a and the BT baseband circuitry 1508b may further include one or more processors and control logic to process the signals received from the corresponding WLAN or BT receive signal path of the radio IC circuitry 1506a-b, and to also generate corresponding WLAN or BT baseband signals for the transmit signal path of the radio IC circuitry 1506a-b. Each of the baseband processing circuitries 1508a and 1508b may further include physical layer (PHY) and medium access control layer (MAC) circuitry, and may further interface with a device for generation and processing of the baseband signals and for controlling operations of the radio IC circuitry 1506a-b.

Referring still to FIG. 15, according to the shown embodiment, WLAN-BT coexistence circuitry 1513 may include logic providing an interface between the WLAN baseband circuitry 1508a and the BT baseband circuitry 1508b to enable use cases requiring WLAN and BT coexistence. In addition, a switch 1503 may be provided between the WLAN FEM circuitry 1504a and the BT FEM circuitry 1504b to allow switching between the WLAN and BT radios according to application needs. In addition, although the antennas 1501 are depicted as being respectively connected to the WLAN FEM circuitry 1504a and the BT FEM circuitry 1504*b*, embodiments include within their scope the sharing of one or more antennas as between the WLAN and BT FEMs, or the provision of more than one antenna connected to each of FEM 1504*a* or 1504*b*.

In some embodiments, the front-end module circuitry 1504*a-b*, the radio IC circuitry 1506*a-b*, and baseband processing circuitry 1508*a-b* may be provided on a single radio card, such as wireless radio card 1502. In some other embodiments, the one or more antennas 1501, the FEM circuitry 1504*a-b* and the radio IC circuitry 1506*a-b* may be provided on a single radio card. In some other embodiments, the radio IC circuitry 1506*a-b* and the baseband processing circuitry 1508*a-b* may be provided on a single chip or integrated circuit (IC), such as IC 1512.

In some embodiments, the wireless radio card 1502 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1508*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 16:
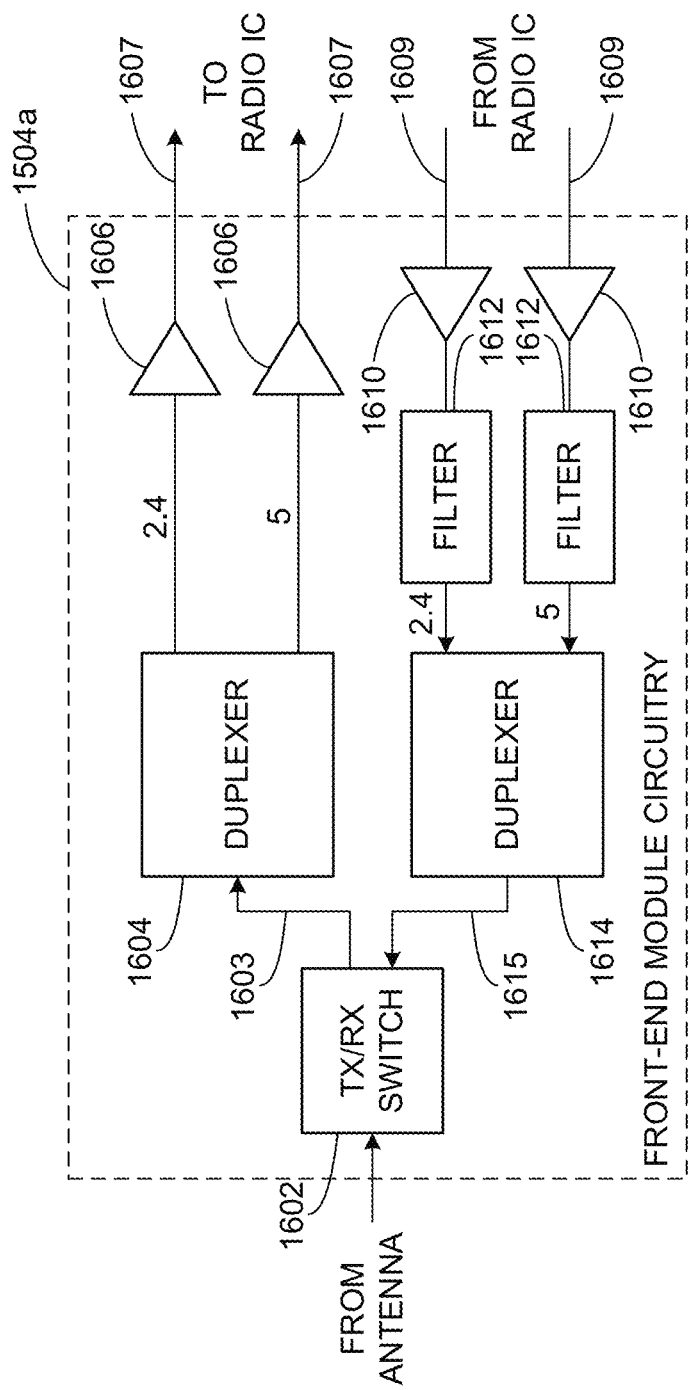
FIG. 16 illustrates an example front-end module circuitry for use in the radio architecture of FIG. 15, in accordance with one or more example embodiments of the present disclosure.

FIG. 16 illustrates WLAN FEM circuitry 1504*a* in accordance with some embodiments. Although the example of FIG. 16 is described in conjunction with the WLAN FEM circuitry 1504*a*, the example of FIG. 16 may be described in conjunction with the example BT FEM circuitry 1504*b* (FIG. 15), although other circuitry configurations may also be suitable.

In some embodiments, the FEM circuitry 1504*a* may include a TX/RX switch 1602 to switch between transmit mode and receive mode operation. The FEM circuitry 1504*a* may include a receive signal path and a transmit signal path. The receive signal path of the FEM circuitry 1504*a* may include a low-noise amplifier (LNA) 1606 to amplify received RF signals 1603 and provide the amplified received RF signals 1607 as an output (e.g., to the radio IC circuitry 1506*a-b* (FIG. 15)). The transmit signal path of the circuitry 1504*a* may include a power amplifier (PA) to amplify input RF signals 1609 (e.g., provided by the radio IC circuitry 1506*a-b*), and one or more filters 1612, such as band-pass filters (BPFs), low-pass filters (LPFs) or other types of filters, to generate RF signals 1615 for subsequent transmission (e.g., by one or more of the antennas 1501 (FIG. 15)) via an example duplexer 1614.

In some dual-mode embodiments for Wi-Fi communication, the FEM circuitry 1504*a* may be configured to operate in either the 2.4 GHz frequency spectrum or the 5 GHz frequency spectrum. In these embodiments, the receive signal path of the FEM circuitry 1504*a* may include a receive signal path duplexer 1604 to separate the signals from each spectrum as well as provide a separate LNA 1606 for each spectrum as shown. In these embodiments, the transmit signal path of the FEM circuitry 1504*a* may also include a power amplifier 1610 and a filter 1612, such as a BPF, an LPF or another type of filter for each frequency spectrum and a transmit signal path duplexer 1604 to provide the signals of one of the different spectrums onto a single transmit path for subsequent transmission by the one or more of the antennas 1501 (FIG. 15). In some embodiments, BT communications may utilize the 2.4 GHz signal paths and may utilize the same FEM circuitry 1504*a* as the one used for WLAN communications.

Figure 17:
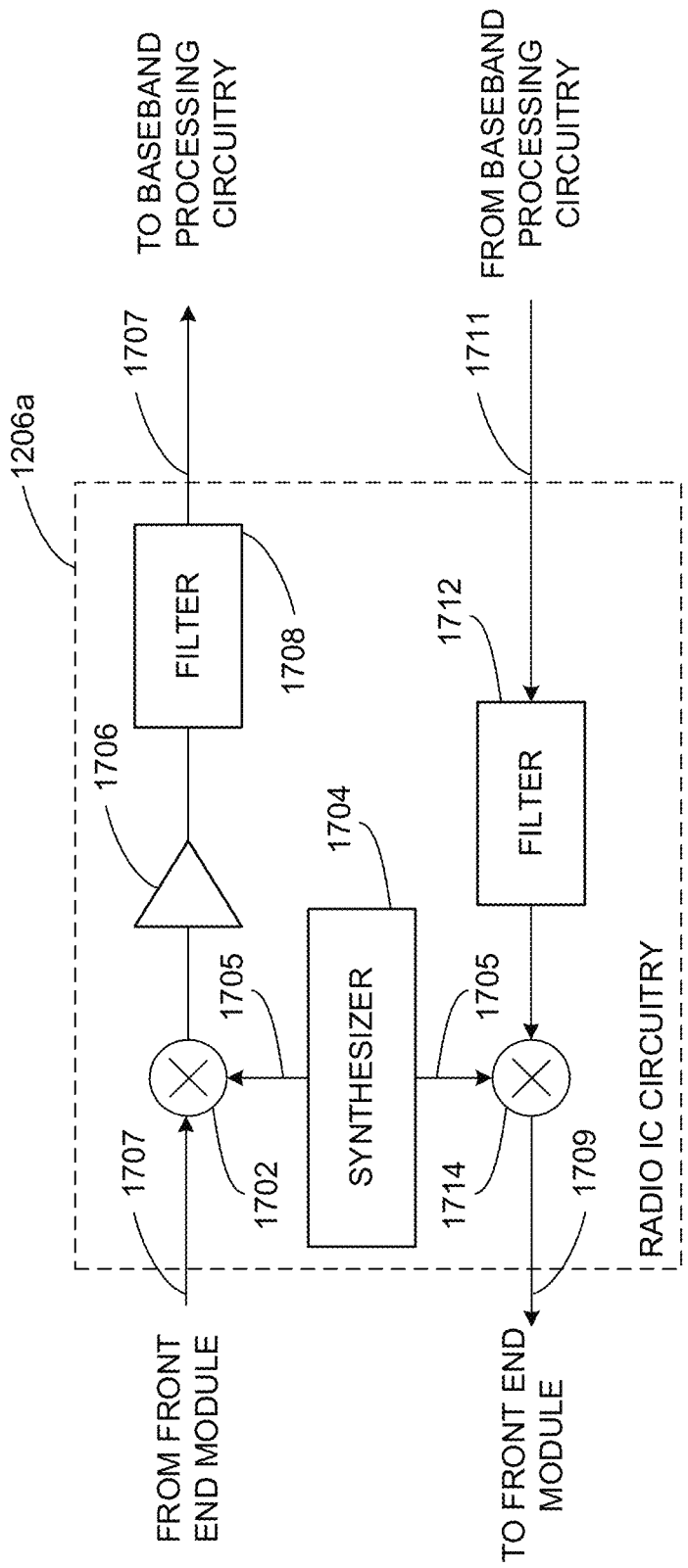
FIG. 17 illustrates an example radio IC circuitry for use in the radio architecture of FIG. 15, in accordance with one or more example embodiments of the present disclosure.

FIG. 17 illustrates radio IC circuitry 1506*a* in accordance with some embodiments. The radio IC circuitry 1506*a* is one example of circuitry that may be suitable for use as the WLAN or BT radio IC circuitry 1506*a*/1506*b* (FIG. 15), although other circuitry configurations may also be suitable. Alternatively, the example of FIG. 17 may be described in conjunction with the example BT radio IC circuitry 1506*b*.

In some embodiments, the radio IC circuitry 1506*a* may include a receive signal path and a transmit signal path. The receive signal path of the radio IC circuitry 1506*a* may include at least mixer circuitry 1702, such as, for example, down-conversion mixer circuitry, amplifier circuitry 1706 and filter circuitry 1708. The transmit signal path of the radio IC circuitry 1506*a* may include at least filter circuitry 1712 and mixer circuitry 1714, such as, for example, up-conversion mixer circuitry. Radio IC circuitry 1506a may also include synthesizer circuitry 1704 for synthesizing a frequency 1705 for use by the mixer circuitry 1702 and the mixer circuitry 1714. The mixer circuitry 1702 and/or 1714 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 17 illustrates only a simplified version of a radio IC circuitry, and may include, although not shown, embodiments where each of the depicted circuitries may include more than one component. For instance, mixer circuitry 1714 may each include one or more mixers, and filter circuitries 1708 and/or 1712 may each include one or more filters, such as one or more BPFs and/or LPFs according to application needs. For example, when mixer circuitries are of the direct-conversion type, they may each include two or more mixers.

In some embodiments, mixer circuitry 1702 may be configured to down-convert RF signals 1607 received from the FEM circuitry 1504a-b (FIG. 15) based on the synthesized frequency 1705 provided by synthesizer circuitry 1704. The amplifier circuitry 1706 may be configured to amplify the down-converted signals and the filter circuitry 1708 may include an LPF configured to remove unwanted signals from the down-converted signals to generate output baseband signals 1707. Output baseband signals 1707 may be provided to the baseband processing circuitry 1508a-b (FIG. 15) for further processing. In some embodiments, the output baseband signals 1707 may be zero-frequency baseband signals, although this is not a requirement. In some embodiments, mixer circuitry 1702 may comprise passive mixers, although the scope of the embodiments is not limited in this respect.

In some embodiments, the mixer circuitry 1714 may be configured to up-convert input baseband signals 1711 based on the synthesized frequency 1705 provided by the synthesizer circuitry 1704 to generate RF output signals 1609 for the FEM circuitry 1504a-b. The baseband signals 1711 may be provided by the baseband processing circuitry 1508a-b and may be filtered by filter circuitry 1712. The filter circuitry 1712 may include an LPF or a BPF, although the scope of the embodiments is not limited in this respect.

In some embodiments, the mixer circuitry 1702 and the mixer circuitry 1714 may each include two or more mixers and may be arranged for quadrature down-conversion and/or up-conversion respectively with the help of synthesizer 1704. In some embodiments, the mixer circuitry 1702 and the mixer circuitry 1714 may each include two or more mixers each configured for image rejection (e.g., Hartley image rejection). In some embodiments, the mixer circuitry 1702 and the mixer circuitry 1714 may be arranged for direct down-conversion and/or direct up-conversion, respectively. In some embodiments, the mixer circuitry 1702 and the mixer circuitry 1714 may be configured for super-heterodyne operation, although this is not a requirement.

Mixer circuitry 1702 may comprise, according to one embodiment: quadrature passive mixers (e.g., for the in-phase (I) and quadrature phase (Q) paths). In such an embodiment, RF input signal 1607 from FIG. 17 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1705 of synthesizer 1704 (FIG. 17). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction in power consumption.

The RF input signal 1607 (FIG. 16) may comprise a balanced signal, although the scope of the embodiments is not limited in this respect. The I and Q baseband output signals may be provided to low-noise amplifier, such as amplifier circuitry 1706 (FIG. 17) or to filter circuitry 1708 (FIG. 17).

In some embodiments, the output baseband signals 1707 and the input baseband signals 1711 may be analog baseband signals, although the scope of the embodiments is not limited in this respect. In some alternate embodiments, the output baseband signals 1707 and the input baseband signals 1711 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1704 may be a fractional-N synthesizer or a fractional N/N+1 synthesizer, although the scope of the embodiments is not limited in this respect as other types of frequency synthesizers may be suitable. For example, synthesizer circuitry 1704 may be a delta-sigma synthesizer, a frequency multiplier, or a synthesizer comprising a phase-locked loop with a frequency divider. According to some embodiments, the synthesizer circuitry 1704 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1704 may be provided by a voltage controlled oscillator (VCO), although that is not a requirement. A divider control input may further be provided by either the baseband processing circuitry 1508a-b (FIG. 15) depending on the desired output frequency 1705. In some embodiments, a divider control input (e.g., N) may be determined from a look-up table (e.g., within a Wi-Fi card) based on a channel number and a channel center frequency as determined or indicated by the example application processor 1510. The application processor 1510 may include, or otherwise be connected to, one of the example secure signal converter 101 or the example received signal converter 103 (e.g., depending on which device the example radio architecture is implemented in).

In some embodiments, synthesizer circuitry 1704 may be configured to generate a carrier frequency as the output frequency 1705, while in other embodiments, the output frequency 1705 may be a fraction of the carrier frequency (e.g., one-half the carrier frequency, one-third the carrier frequency). In some embodiments, the output frequency 1705 may be a LO frequency (fLO).

Figure 18:
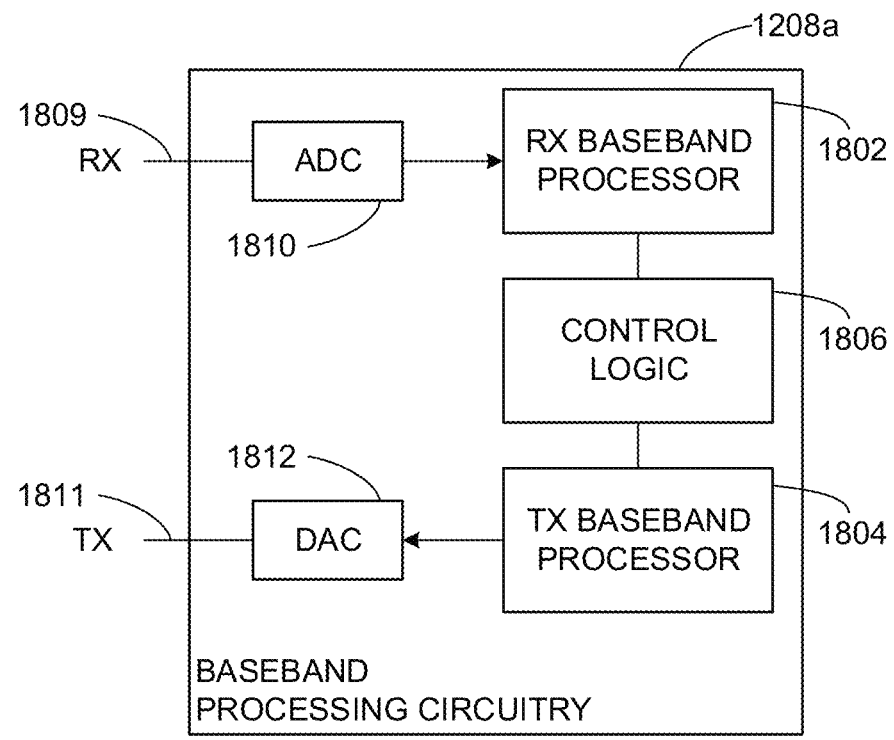
FIG. 18 illustrates an example baseband processing circuitry for use in the radio architecture of FIG. 15, in accordance with one or more example embodiments of the present disclosure.

FIG. 18 illustrates a functional block diagram of baseband processing circuitry 1508*a* in accordance with some embodiments. The baseband processing circuitry 1508*a* is one example of circuitry that may be suitable for use as the baseband processing circuitry 1508*a* (FIG. 15), although other circuitry configurations may also be suitable. Alternatively, the example of FIG. 17 may be used to implement the example BT baseband processing circuitry 1508*b* of FIG. 15.

The baseband processing circuitry 1508*a* may include a receive baseband processor (RX BBP) 1802 for processing receive baseband signals 1709 provided by the radio IC circuitry 1506*a-b* (FIG. 15) and a transmit baseband processor (TX BBP) 1804 for generating transmit baseband signals 1711 for the radio IC circuitry 1506*a-b*. The baseband processing circuitry 1508*a* may also include control logic 1806 for coordinating the operations of the baseband processing circuitry 1508*a*.

In some embodiments (e.g., when analog baseband signals are exchanged between the baseband processing circuitry 1508*a-b* and the radio IC circuitry 1506*a-b*), the baseband processing circuitry 1508*a* may include ADC 1810 to convert analog baseband signals 1809 received from the radio IC circuitry 1506*a-b* to digital baseband signals for processing by the RX BBP 1802. In these embodiments, the baseband processing circuitry 1508*a* may also include DAC 1812 to convert digital baseband signals from the TX BBP 1804 to analog baseband signals 1811.

In some embodiments that communicate OFDM signals or OFDMA signals, such as through baseband processor 1508*a*, the transmit baseband processor 1804 may be configured to generate OFDM or OFDMA signals as appropriate for transmission by performing an inverse fast Fourier transform (IFFT). The receive baseband processor 1802 may be configured to process received OFDM signals or OFDMA signals by performing an FFT. In some embodiments, the receive baseband processor 1802 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 15, in some embodiments, the antennas 1501 (FIG. 15) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1501 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: generate two or more sounding signals to be sent using two or more antennas to a receiving device across a plurality of symbol intervals; apply a first masking signal to a first sounding signal of the two or more sounding signals over a first symbol interval of the plurality of the symbol intervals; apply a second masking signal to a second sounding signal over a second symbol interval of the plurality of the symbol intervals; and cause to send the two or more sounding signals to receiving device using the two or more antennas.

Example 2 may include the device of example 1 and/or some other example herein, wherein the sounding signals are different across the one or antennas.

Example 3 may include the device of example 1 and/or some other example herein, wherein the two or more sounding signals are generated using different masking signals.

Example 4 may include the device of example 1 and/or some other example herein, wherein the processing circuitry may be further configured to apply a p-matrix phase rotation to the two or more sounding signals.

Example 5 may include the device of example 1 and/or some other example herein, wherein a same masking signal may be maintained across the two or more antennas.

Example 6 may include the device of example 1 and/or some other example herein, wherein a same sounding signal may be maintained across the plurality of the symbol intervals.

Example 7 may include the device of example 1 and/or some other example herein, wherein an inverse p-matrix may be to be used by the receiving device to recover original sounding signals.

Example 8 may include the device of example 1 and/or some other example herein, wherein masking signals are different across the plurality of the symbol intervals.

Example 9 may include a non-transitory computer-readable medium storing computer-executable instructions which when executed by one or more processors result in performing operations comprising: generating two or more sounding signals to be sent using two or more antennas to a receiving device across a plurality of symbol intervals; applying a first masking signal to a first sounding signal of the two or more sounding signals over a first symbol interval of the plurality of the symbol intervals; applying a second masking signal to a second sounding signal over a second symbol interval of the plurality of the symbol intervals; and causing to send the two or more sounding signals to receiving device using the two or more antennas.

Example 10 may include the non-transitory computer-readable medium of example 9 and/or some other example herein, wherein the sounding signals are different across the one or antennas.

Example 11 may include the non-transitory computer-readable medium of example 9 and/or some other example herein, wherein the two or more sounding signals are generated using different masking signals.

Example 12 may include the non-transitory computer-readable medium of example 9 and/or some other example herein, wherein the operations further comprise applying a p-matrix phase rotation to the two or more sounding signals.

Example 13 may include the non-transitory computer-readable medium of example 9 and/or some other example herein, wherein a same masking signal may be maintained across the two or more antennas.

Example 14 may include the non-transitory computer-readable medium of example 9 and/or some other example herein, wherein a same sounding signal may be maintained across the plurality of the symbol intervals.

Example 15 may include the non-transitory computer-readable medium of example 9 and/or some other example herein, wherein an inverse p-matrix may be to be used by the receiving device to recover original sounding signals.

Example 16 may include the non-transitory computer-readable medium of example 9 and/or some other example herein, wherein masking signals are different across the plurality of the symbol intervals.

Example 17 may include a method comprising: generating, by one or more processors, two or more sounding signals to be sent using two or more antennas to a receiving device across a plurality of symbol intervals; applying a first masking signal to a first sounding signal of the two or more sounding signals over a first symbol interval of the plurality of the symbol intervals; applying a second masking signal to a second sounding signal over a second symbol interval of the plurality of the symbol intervals; and causing to send the two or more sounding signals to receiving device using the two or more antennas.

Example 18 may include the method of example 17 and/or some other example herein, wherein the sounding signals are different across the one or antennas.

Example 19 may include the method of example 17 and/or some other example herein, wherein the two or more sounding signals are generated using different masking signals.

Example 20 may include the method of example 17 and/or some other example herein, further comprising applying a p-matrix phase rotation to the two or more sounding signals.

Example 21 may include the method of example 17 and/or some other example herein, wherein a same masking signal may be maintained across the two or more antennas.

Example 22 may include the method of example 17 and/or some other example herein, wherein a same sounding signal may be maintained across the plurality of the symbol intervals.

Example 23 may include the method of example 17 and/or some other example herein, wherein an inverse p-matrix may be to be used by the receiving device to recover original sounding signals.

Example 24 may include the method of example 17 and/or some other example herein, wherein masking signals are different across the plurality of the symbol intervals.

Example 25 may include an apparatus comprising means for: generating two or more sounding signals to be sent using two or more antennas to a receiving device across a plurality of symbol intervals; applying a first masking signal to a first sounding signal of the two or more sounding signals over a first symbol interval of the plurality of the symbol intervals; applying a second masking signal to a second sounding signal over a second symbol interval of the plurality of the symbol intervals; and causing to send the two or more sounding signals to receiving device using the two or more antennas.

Example 26 may include the apparatus of example 25 and/or some other example herein, wherein the sounding signals are different across the one or antennas.

Example 27 may include the apparatus of example 25 and/or some other example herein, wherein the two or more sounding signals are generated using different masking signals.

Example 28 may include the apparatus of example 25 and/or some other example herein, further comprising applying a p-matrix phase rotation to the two or more sounding signals.

Example 29 may include the apparatus of example 25 and/or some other example herein, wherein a same masking signal may be maintained across the two or more antennas.

Example 30 may include the apparatus of example 25 and/or some other example herein, wherein a same sounding signal may be maintained across the plurality of the symbol intervals.

Example 31 may include the apparatus of example 25 and/or some other example herein, wherein an inverse p-matrix may be to be used by the receiving device to recover original sounding signals.

Example 32 may include the apparatus of example 25 and/or some other example herein, wherein masking signals are different across the plurality of the symbol intervals.

Example 33 may include one or more non-transitory computer-readable media comprising instructions to cause an electronic device, upon execution of the instructions by one or more processors of the electronic device, to perform one or more elements of a method described in or related to any of examples 1-32, or any other method or process described herein.

Example 34 may include an apparatus comprising logic, modules, and/or circuitry to perform one or more elements of a method described in or related to any of examples 1-32, or any other method or process described herein.

Example 35 may include a method, technique, or process as described in or related to any of examples 1-32, or portions or parts thereof.

Example 36 may include an apparatus comprising: one or more processors and one or more computer readable media comprising instructions that, when executed by the one or more processors, cause the one or more processors to perform the method, techniques, or process as described in or related to any of examples 1-32, or portions thereof.

Example 37 may include a method of communicating in a wireless network as shown and described herein.

Example 38 may include a system for providing wireless communication as shown and described herein.

Example 39 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
generate two or more sounding signals to be sent using two or more antennas to a receiving device across a plurality of symbol intervals, wherein each sounding signal comprising a P-matrix phase rotation, a secure signal, and a masking signal;
apply a first masking signal to a first sounding signal of the two or more sounding signals over a first symbol interval of the plurality of the symbol intervals;
apply a second masking signal to a second sounding signal over a second symbol interval of the plurality of the symbol intervals; and
cause to send the two or more sounding signals to the receiving device using the two or more antennas, wherein the secure signals are different across antennas and remain constant over time, and the masking signals are different across symbol intervals and remain constant across antennas.

2. The device of claim 1, wherein the sounding signals are different across the one or antennas.

3. The device of claim 1, wherein the two or more sounding signals are generated using different masking signals.

4. The device of claim 1, wherein the processing circuitry is further configured to apply a p-matrix phase rotation to the two or more sounding signals.

5. The device of claim 1, wherein a same masking signal is maintained across the two or more antennas.

6. The device of claim 1, wherein a same sounding signal is maintained across the plurality of the symbol intervals.

7. The device of claim 1, wherein an inverse p-matrix is to be used by the receiving device to recover original sounding signals.

8. The device of claim 1, wherein masking signals are different across the plurality of the symbol intervals.

9. A non-transitory computer-readable medium storing computer-executable instructions which when executed by one or more processors result in performing operations comprising:
generating two or more sounding signals to be sent using two or more antennas to a receiving device across a plurality of symbol intervals, wherein each sounding signal comprising a P-matrix phase rotation, a secure signal, and a masking signal;
applying a first masking signal to a first sounding signal of the two or more sounding signals over a first symbol interval of the plurality of the symbol intervals;
applying a second masking signal to a second sounding signal over a second symbol interval of the plurality of the symbol intervals; and
causing to send the two or more sounding signals to the receiving device using the two or more antennas, wherein the secure signals are different across antennas and remain constant over time, and the masking signals are different across symbol intervals and remain constant across antennas.

10. The non-transitory computer-readable medium of claim 9, wherein the sounding signals are different across the one or antennas.

11. The non-transitory computer-readable medium of claim 9, wherein the two or more sounding signals are generated using different masking signals.

12. The non-transitory computer-readable medium of claim 9, wherein the operations further comprise applying a p-matrix phase rotation to the two or more sounding signals.

13. The non-transitory computer-readable medium of claim 9, wherein a same masking signal is maintained across the two or more antennas.

14. The non-transitory computer-readable medium of claim 9, wherein a same sounding signal is maintained across the plurality of the symbol intervals.

15. The non-transitory computer-readable medium of claim 9, wherein an inverse p-matrix is to be used by the receiving device to recover original sounding signals.

16. The non-transitory computer-readable medium of claim 9, wherein masking signals are different across the plurality of the symbol intervals.

17. A method comprising:

generating, by one or more processors, two or more sounding signals to be sent using two or more antennas to a receiving device across a plurality of symbol intervals, wherein each sounding signal comprising a P-matrix phase rotation, a secure signal, and a masking signal;

applying a first masking signal to a first sounding signal of the two or more sounding signals over a first symbol interval of the plurality of the symbol intervals;

applying a second masking signal to a second sounding signal over a second symbol interval of the plurality of the symbol intervals; and causing to send the two or more sounding signals to the receiving device using the two or more antennas, wherein the secure signals are different across antennas and remain constant over time, and the masking signals are different across symbol intervals and remain constant across antennas.

18. The method of claim 17, wherein the sounding signals are different across the one or antennas.

19. The method of claim 17, wherein the two or more sounding signals are generated using different masking signals.

20. The method of claim 17, further comprising applying a p-matrix phase rotation to the two or more sounding signals.

* * * * *